United States Patent
Saylor et al.

(10) Patent No.: US 10,809,545 B2
(45) Date of Patent: Oct. 20, 2020

(54) HEADWORN SUPPORTS HAVING DYNAMIC VENTING SYSTEMS

(71) Applicant: Oakley, Inc., Foothill Ranch, CA (US)

(72) Inventors: Ryan Neil Saylor, Mission Viejo, CA (US); Ryan Anthony Calilung, Irvine, CA (US); Ron Derek Dema-Ala, Aliso Viejo, CA (US); Christopher Lee Greenwalt, Mission Viejo, CA (US); Brian McNeill, Newport Beach, CA (US); Dugan O'Keene, Newport Beach, CA (US); Bryson Morgan Stewart, Costa Mesa, CA (US)

(73) Assignee: Oakley, Inc., Foothill Ranch, CA (US)

( * ) Notice: Subject to any disclaimer, the term of this patent is extended or adjusted under 35 U.S.C. 154(b) by 174 days.

(21) Appl. No.: 15/952,910

(22) Filed: Apr. 13, 2018

(65) Prior Publication Data
US 2018/0299692 A1 Oct. 18, 2018

Related U.S. Application Data

(60) Provisional application No. 62/485,813, filed on Apr. 14, 2017.

(51) Int. Cl.
*G02C 5/12* (2006.01)
*G02C 5/20* (2006.01)

(52) U.S. Cl.
CPC .............. *G02C 5/122* (2013.01); *G02C 5/20* (2013.01)

(58) Field of Classification Search
None
See application file for complete search history.

(56) References Cited

U.S. PATENT DOCUMENTS

| 5,971,538 | A  | * | 10/1999 | Heffner  | G02C 5/122 345/8 |
|---|---|---|---|---|---|
| 8,262,219 | B2 |   | 9/2012  | Lee et al. | |
| 9,122,078 | B2 |   | 9/2015  | Calilung et al. | |
| 9,188,792 | B2 |   | 11/2015 | Calilung et al. | |
| 10,156,734 | B2 |  | 12/2018 | McCabe et al. | |
| 2004/0080706 | A1 | | 4/2004 | Howard | |
| 2005/0015862 | A1 | * | 1/2005 | Dondero | A61B 5/0002 2/436 |

(Continued)

FOREIGN PATENT DOCUMENTS

WO    WO 2014/036274 A2    3/2014

OTHER PUBLICATIONS

Corrected International Search Report and Written Opinion of the International Searching Authority directed to related International Patent Application No. PCT/US18/27587, dated Jul. 20, 2018; 16 pages.

*Primary Examiner* — William R Alexander
*Assistant Examiner* — Gary W O'Neill
(74) *Attorney, Agent, or Firm* — Sterne, Kessler, Goldstein & Fox P.L.L.C.

(57) ABSTRACT

Eyewear is disclosed that can have multiple ventilation states providing different amounts of ventilation through the eyewear. The eyewear can include a lens and a frame. In some embodiments, the lens and/or frame can be moved with respect to the user to provide the multiple ventilation states. In some embodiments, the eyewear can include a nosepiece which is movable from at least a first configuration to a second configuration to provide the multiple ventilation states.

40 Claims, 11 Drawing Sheets

(56) References Cited

U.S. PATENT DOCUMENTS

2014/0059747 A1\* 3/2014 Belbey .................... A61F 9/028
  2/431
2016/0216533 A1 7/2016 Calilung et al.
2017/0160562 A1 6/2017 McCabe et al.

\* cited by examiner

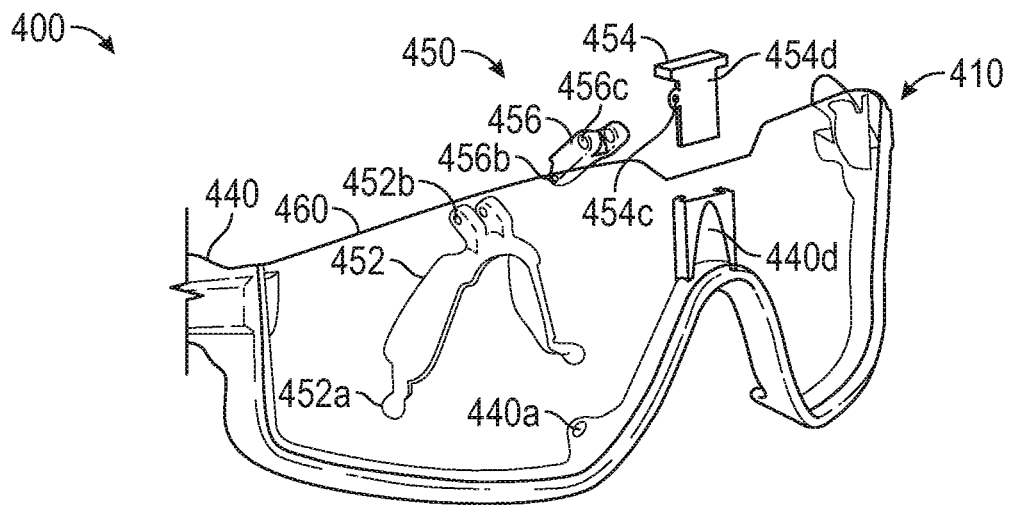
FIG. 6
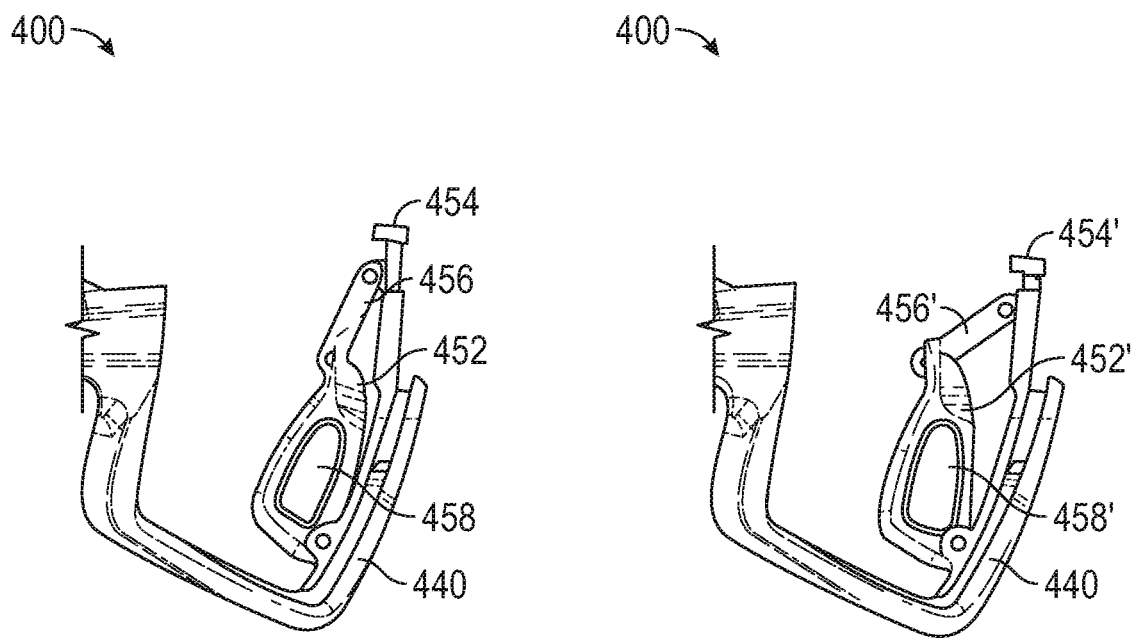
FIG. 7  FIG. 8

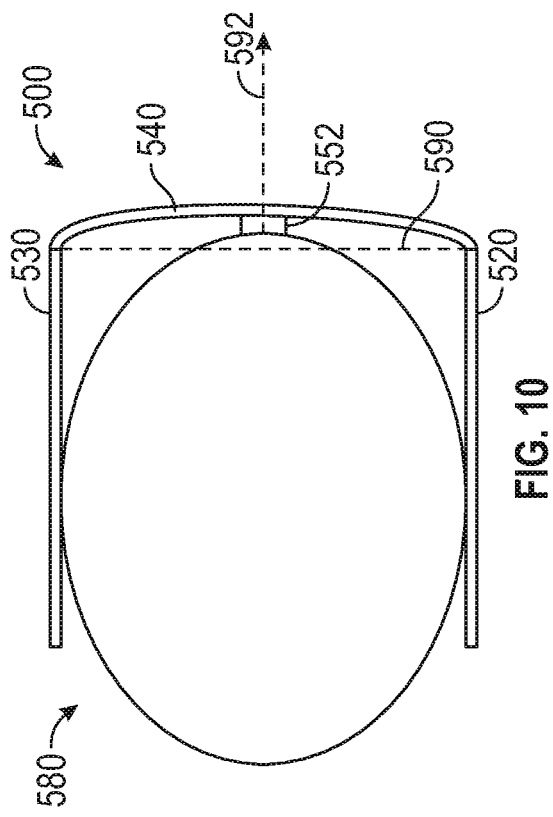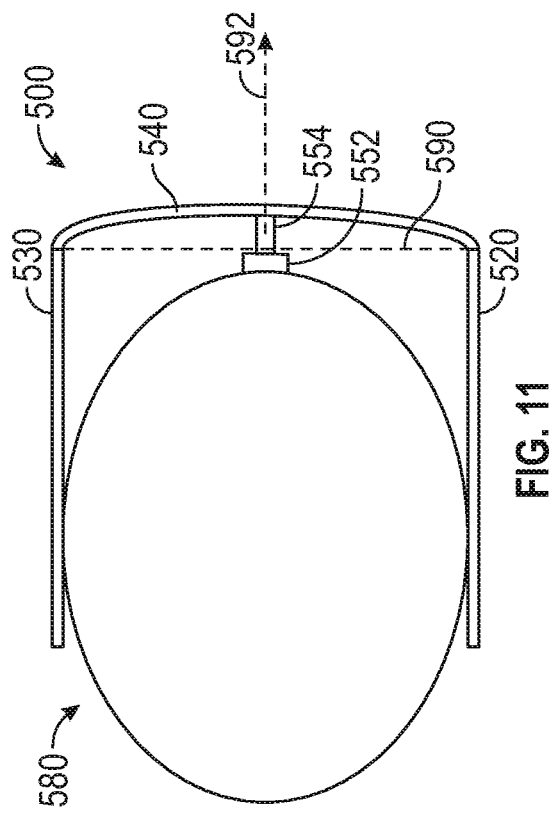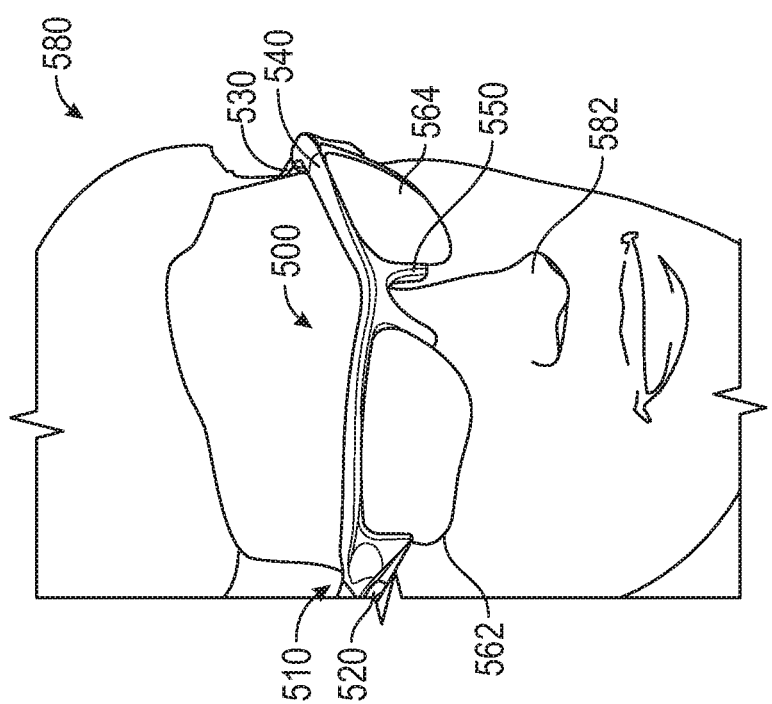

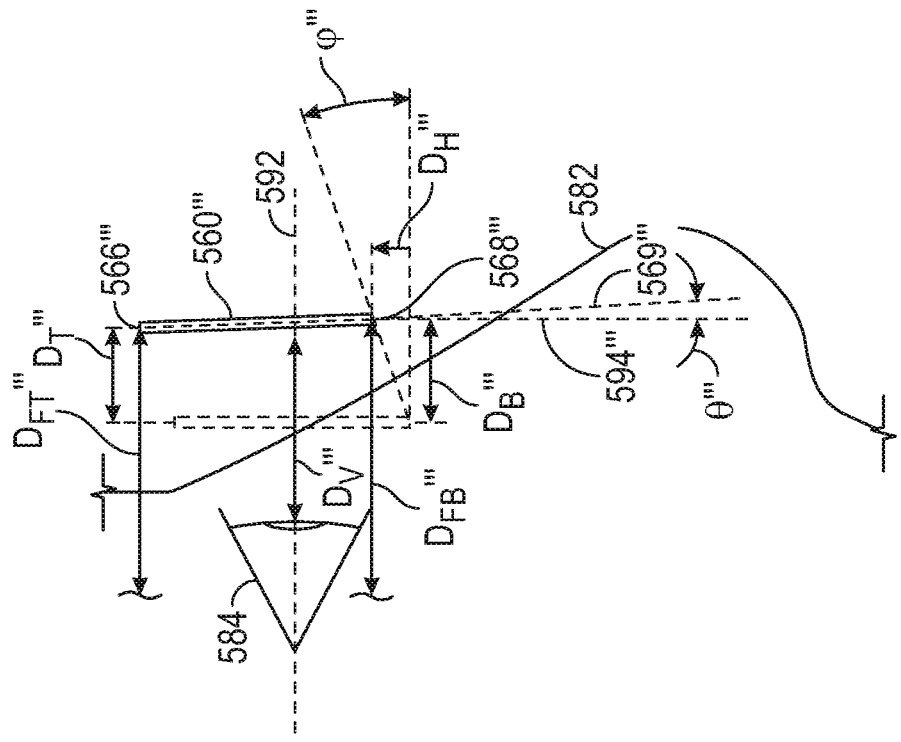
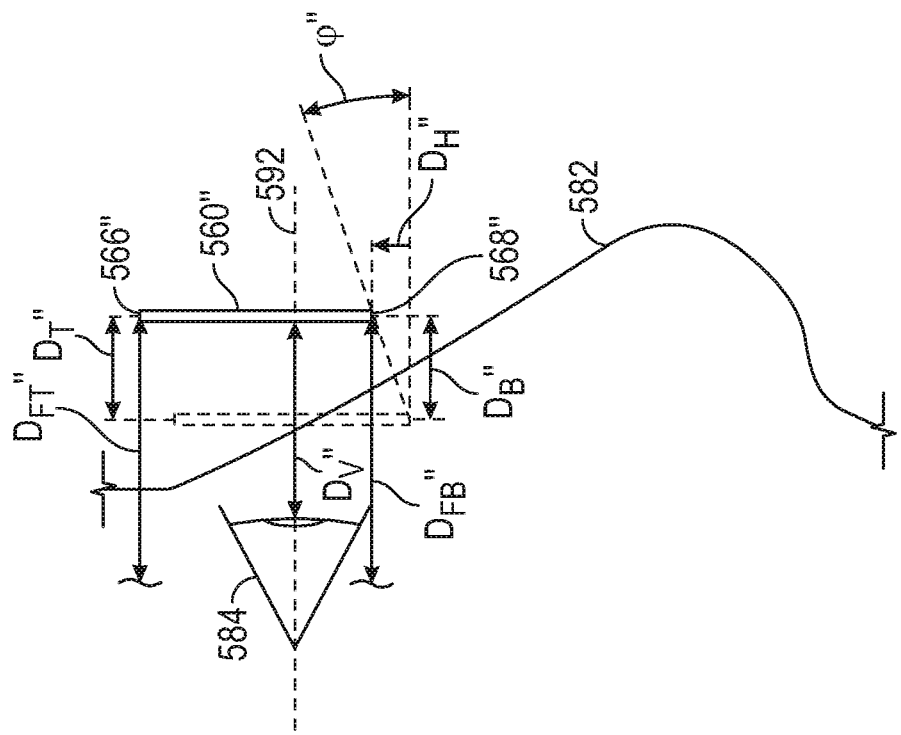

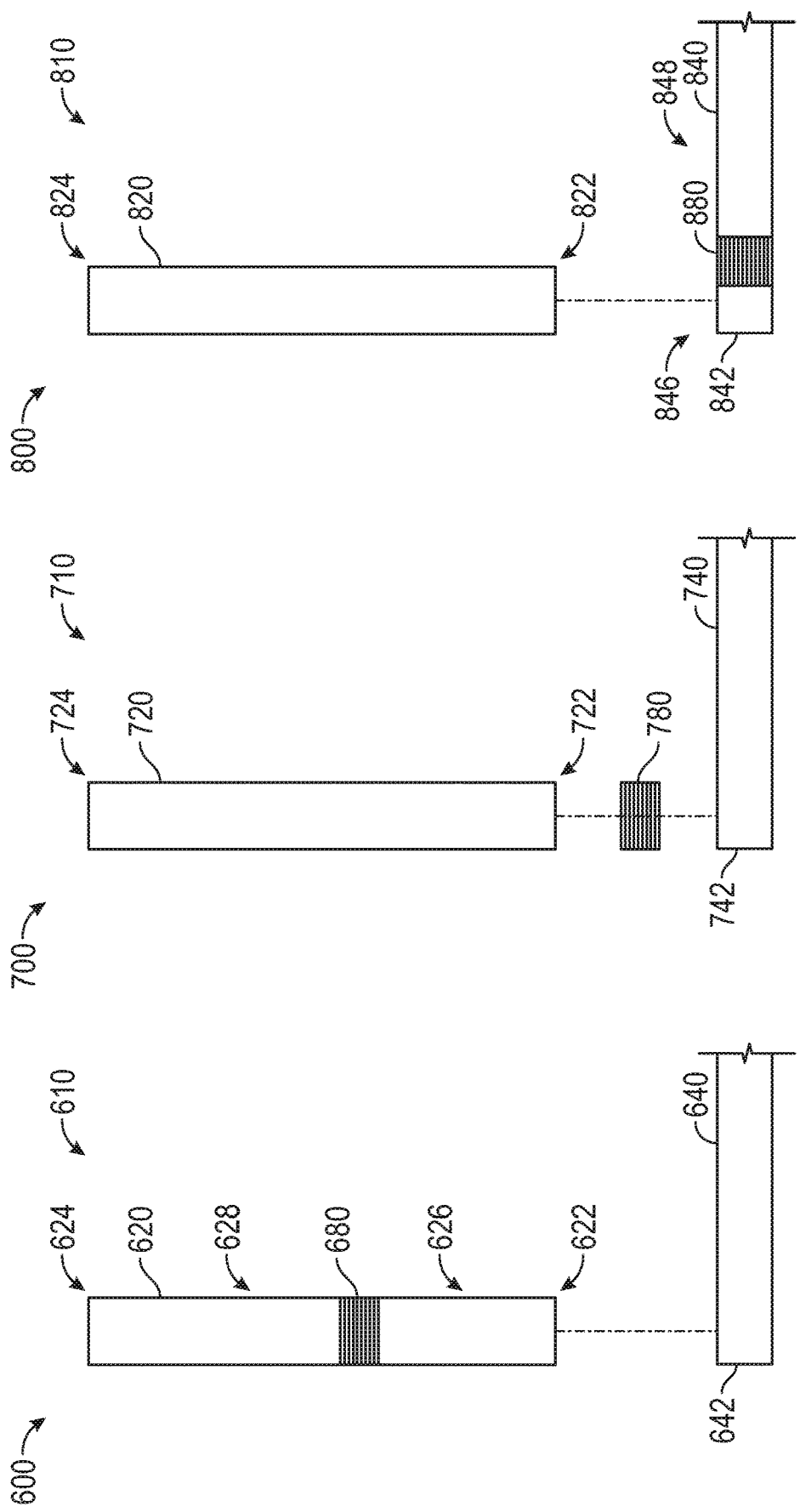

HEADWORN SUPPORTS HAVING DYNAMIC VENTING SYSTEMS

CROSS REFERENCE TO RELATED APPLICATION

This application claims the benefit of priority to U.S. Provisional Application No. 62/485,813, filed on Apr. 14, 2017, which is herein incorporated by reference in its entirety.

BACKGROUND

Field

This disclosure relates to vented eyewear, and more specifically to eyewear having multiple ventilation states that produce different levels of ventilation.

Background

A wide variety of eyewear products are available. Some eyewear products suffer from various drawbacks, such as insufficient ventilation, insufficient protection (e.g., at lateral, superior, or inferior portions of the eyewear), etc. The embodiments disclosed herein address some of these drawbacks.

SUMMARY

Example embodiments described herein have several features, no single one of which is indispensable or solely responsible for their desirable attributes. Without limiting the scope of the claims, some of the advantageous features will now be summarized. While the features and structures are described below in connection with embodiments of eyewear such as eyeglasses and goggles, it is to be understood that the features and structures can be implemented in any headworn support (i.e., a headworn article that can support one or more lenses and/or displays in the wearer's field of view). For example, other headworn supports can include, but are not limited to, helmets, face masks, balaclavas, and breaching shields.

In some embodiments, the eyewear can include a frame. The frame can extend laterally between left and right limits. The frame can have a linear lateral reference line extending from side to side through the left and right limits. The frame can have an anterior-posterior (AP) reference line transverse to the lateral reference line and extending straight ahead of the frame. The eyewear can at least one lens supported by the frame. The eyewear can have a nosepiece movably carried by the frame. The nosepiece can be movable while in an as-worn position between at least a first position such that a reference point on the lens is at a first vertex distance from an eye of a wearer in an as worn orientation and a second position such that the reference point is maintained at a second vertex distance from the eye of the wearer in the as worn orientation.

In some embodiments, a headworn support can include a frame, extending laterally between left and right limits. The frame can have an anterior-posterior (AP) reference axis extending straight ahead of the frame. The headworn support can have at least one lens supported by the frame. The at least one lens can have an upper edge and a lower edge. The headworn support can have a nosepiece movably carried by the frame. The nosepiece can be movable while in an as-worn position between at least a first configuration and a second configuration such that, when worn by a user the upper edge of the at least one lens is posteriorly-anteriorly (PA) shifted and the lower edge of the at least one lens is posteriorly-anteriorly (PA) shifted. The PA shifts of the upper and lower edges of the at least one lens can be approximately the same.

In some embodiments, an eyeglass can have selectively variable venting. The eyeglass can have a frame. The eyeglass can have left and right earstems. The eyeglass can have at least one lens. The at least one lens can have a top edge and a bottom edge held by the frame such that the top edge is spaced apart from a face of a wearer by a top gap distance and the bottom edge is spaced apart from the face of the wearer by a bottom gap distance. The eyeglass can have a nosepiece pivotally movably carried by the eyeglass. The top gap distance and the bottom gap distance can change by substantially the same amount as the nosepiece is pivoted moved while in an as-worn position between a forward position and a rearward position.

In some embodiments, a nosepiece assembly can be attached to a headworn support. The headworn support can include a frame having an anterior-posterior (AP) reference axis extending straight ahead of the frame. The headworn support can include at least one lens supported by the frame, the at least one lens having an upper edge and a lower edge. The nosepiece assembly can have a nosepiece. The nosepiece assembly can have a mechanism coupled to the nosepiece. The nosepiece can be movable while in an as-worn position between at least a first configuration and a second configuration such that, when worn by a user, the upper edge of the at least one lens can be posteriorly-anteriorly (PA) shifted and the lower edge of the at least one lens can be posteriorly-anteriorly (PA) shifted.

BRIEF DESCRIPTION OF THE DRAWINGS

These and other features, aspects and advantages are described below with reference to the drawings, which are intended to illustrate embodiments of eyewear including embodiments of various components of these eyewear.

FIG. 6 illustrates a perspective view of components of another embodiment of an eyewear having a dynamic venting system, the components of the eyewear shown in an exploded configuration.

FIG. 7 illustrates a side view of the eyewear of FIG. 6, the nosepiece assembly being in a first configuration.

FIG. 8 illustrates a side view of the eyewear of FIG. 6, the nosepiece assembly being in a second configuration.

FIG. 9 illustrates a perspective view of an embodiment of an eyewear having a dynamic venting system worn on a user's face.

FIG. 10 illustrates a top-oriented schematic of the eyewear and user shown in FIG. 9, the eyewear being in a first configuration.

FIG. 11 illustrates a top-oriented schematic of the eyewear and user shown in FIG. 9, the eyewear being in a second configuration.

FIG. 14 illustrates a side-oriented schematic of the lens of eyewear of FIG. 12, the lens having been transitioned to a second position via a posterior-anterior shift and an inferior-superior shift.

FIG. 15 illustrates a side-oriented schematic of the lens of eyewear of FIG. 12, the lens having been transitioned to a second position via a posterior-anterior shift, an inferior-superior shift, and a retroscopic tilt shift.

FIG. 16 illustrates a top-oriented schematic of an embodiment of an eyewear having a movable coupling on an earstem of the eyewear.

FIG. 17 illustrates a top-oriented schematic of an embodiment of an eyewear having a movable coupling forming a joint between the earstem and frame of the eyewear.

FIG. 18 illustrates a top-oriented schematic of an embodiment of an eyewear having a movable coupling on a frame of the eyewear.

DETAILED DESCRIPTION

Figure 1:
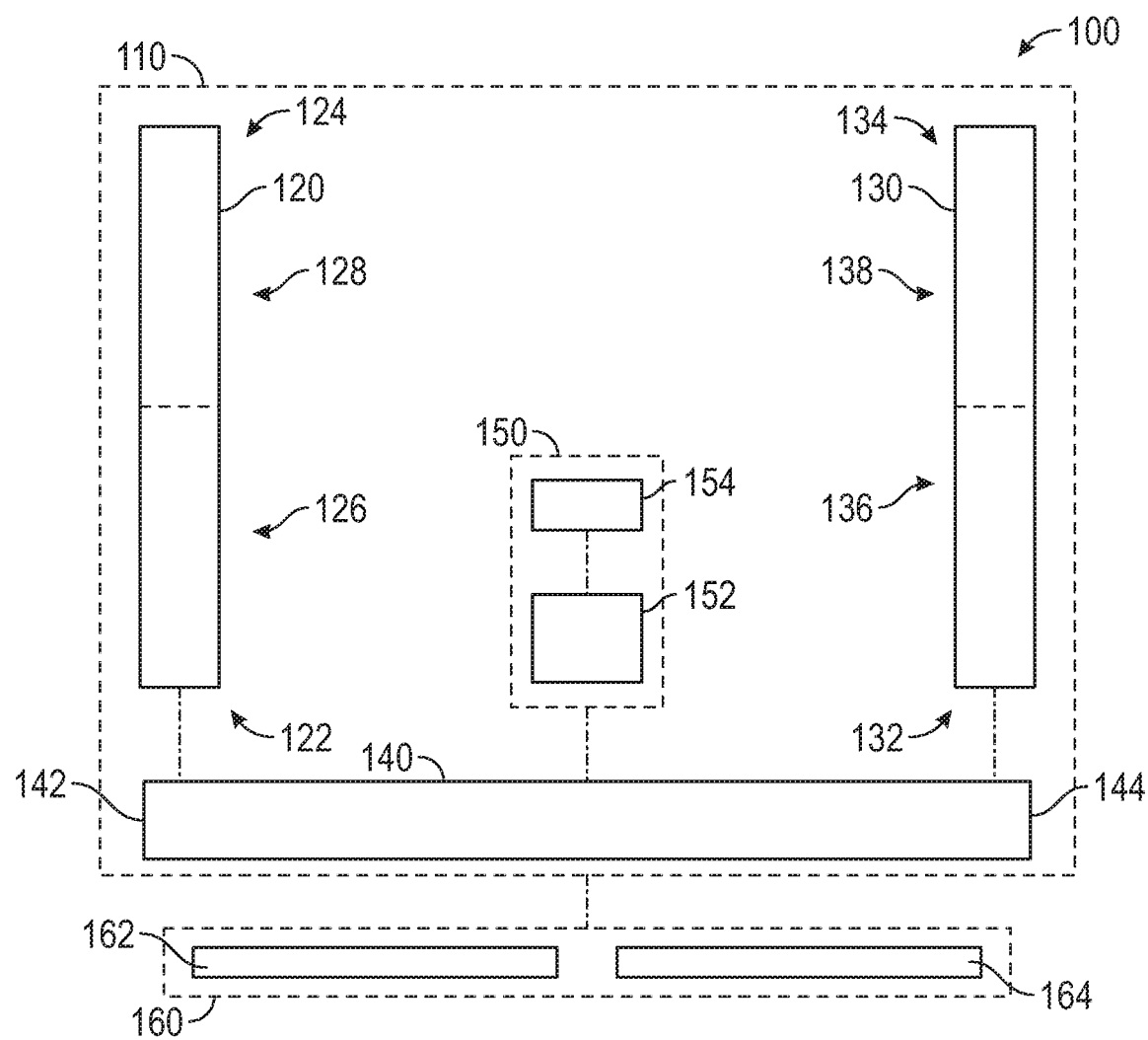
FIG. 1 illustrates a schematic of an embodiment of an eyewear having a dynamic venting system.

Certain terminology may be used in the following description for the purpose of reference only, and thus are not intended to be limiting. For example, terms such as "upper", "lower", "upward", "downward", "above", "below", "top", "bottom" and similar terms refer to directions in the drawings to which reference is made. Terms such as "anterior", "posterior", "superior", "inferior," "medial", and "lateral" describe the orientation and/or location of portions of the components or elements within a consistent but arbitrary frame of reference which is made clear by reference to the text and the associated drawings describing the components or elements under discussion. Such terminology may include the words specifically mentioned above, derivatives thereof, and words of similar import. Similarly, the terms "first", "second", and other such numerical terms referring to structures neither imply a sequence or order unless clearly indicated by the context.

It is to be understood that the frame of reference (e.g., the axes and planes) described herein are discussed in connection within standard contexts with a user's head in an upright vertical position. For example, the anatomical superior-inferior axis is generally referred to in connection with a vertical axis, the anatomical medio-lateral axis is generally referred to in connection with a horizontal side-to-side axis, and anatomical transverse plane is generally referred to in connection with a horizontal plane. This can be measured, for example, on a standard headform such as, but not limited to, an Alderson headform, an EN168 headform, a CSA Z262.2-14 headform, or any other standard headform. However, it also is to be understood that the frame of reference described herein may be shifted in other contexts. For example, in some instances, the frame of reference may be shifted for different sporting activities in which a user's face is angled towards the ground (a "heads-down" activity) which could include, for example, sprinting, skiing, or bicycle racing. The frame of reference may in other instances be shifted for sporting activities in which a user's face is angled away from the ground. It is contemplated that the movement of the eyewear described herein can be configured for different activities. For example, one eyewear can be configured for use during standard activities (i.e., head in an upright vertical position) and another eyewear can be configured for use during heads-down activities. As another example, the eyewear can include interchangeable components such as, but not limited to, nosepiece assemblies which can be chosen by a user based on the type of activity in which the user intends to perform.

While the present description sets forth specific details of various embodiments, it will be appreciated that the description is illustrative only and should not be construed in any way as limiting. Additionally, although particular embodiments may be disclosed or shown in the context of particular types of eyewear systems, such as unitary lens eyeglasses, dual lens eyeglasses having partial or full orbitals, and goggles, it is understood that any elements of the disclosure may be used in any type of eyewear system. Moreover, any elements of the disclosure may be used in any headworn support (i.e., a headworn article that can support one or more lenses in the wearer's field of view). For example, other types of headworn supports can include, but are not limited to, helmets, face masks, balaclavas, and breaching shields. Moreover, while particular embodiments may be disclosed or shown in the context of lenses, it is understood that any elements of the disclosure may be used in headworn supports which have displays in lieu of, or in combination with, lenses. In some instances, the lens can form part of the display. Accordingly, it is to be understood that the one or more lenses in the present disclosure can be substituted with one or more displays.

Further, although embodiments disclosed herein can be used with eyewear that have removable and replaceable lenses, embodiments are also contemplated in which the eyewear are not intended to provide for removable or replaceable lenses. Although some embodiments are illustrated with lenses having "cylindrical" or "spherical" front and rear surfaces (surfaces which conform substantially to a portion of the surface of a cylinder or sphere, respectively), it will be understood by those having ordinary skill in the art that, in some embodiments, lenses having different surface geometries can be used. Additionally, it will be understood that lenses of many front elevational shapes and orientations in the as-worn position can be used, beyond those illustrated herein. In particular, either the front or rear surface of a lens may conform to the surface of a toroidal or other aspheric geometry. Any feature, structure, function, material, method, or step disclosed and/or illustrated in this specification can be used by itself or with or instead of any other feature, structure, function, material, method, or step disclosed and/ or illustrated elsewhere in this specification. Each portion of this specification is contemplated to be interchangeable and no portion is indispensable or essential.

Generally, headworn supports with lenses, including eyewear such as eyeglasses and goggles, are configured to provide desired optical functionality for a wearer. These headworn supports have long been designed with the general objective of blocking the sun or other sources of bright light from one's eyes. These headworn supports may also be used to intercept, wind, dust, etc. from directly in front of the wearer and peripherally along the sides. Lens designs have further developed in response to various optical considerations such as optical clarity, resolution, field of vision, refraction, and other such qualities. In some instances such as a decentered bispherical system, the optical qualities of the lens are higher when the wearer's straight ahead normal line of sight (LOS) extends in parallel to or deviates no more than about ±6°, preferably no more than about ±4° or ±3° from the optical center line (OCL) the lens. In a constant thickness lens, the wearer's straight ahead normal LOS preferably intersects the posterior surface of the lens at about 90°.

In use, however, the lens or lenses can become clouded through condensation on the inner surface of the lens (e.g., the surface nearest the face of the user), reducing the wearer's visibility and/or degrading the optical performance of the lens. To reduce condensation on the lens, the headworn support can be configured to be vented using dynamic and/or passive means. Venting can increase air flow at the inner surface or region of the lens and between the lens and the user, thereby reducing condensation. However, while increased air flow can be beneficial in reducing condensation, increased air flow can also cause discomfort to the user due to, for example, drying out of the user's eyes. Accordingly, it can be advantageous to allow a user to control the amount of venting.

In the dynamic venting systems described herein, structures of the headworn supports with lenses can be moved by the user to modify the amount of venting between the inner surface or region of the lens and between the lens and the user. The user can thereby select a desired amount of venting based on factors such as current operating conditions (e.g., amount of condensation, rate of generation of condensation, environmental conditions) and the user's comfort. In some implementations, the movement range of the lens can be from a first, posterior position and a second, anterior position. In some embodiments, the first, posterior position can allow for some venting and the second, anterior increased venting position can allow for a higher amount of venting. However, it is to be understood that the first, posterior position can allow for no venting (e.g., the headworn support forming a seal around the user's face) and the second, anterior increased venting position can allow for venting (e.g., headworn support no longer forming a seal around the user's face). Moreover, in the dynamic venting systems described herein, the movement range of the lens can be chosen to maintain a desired amount of optical performance of the lens. For example, the movement range of the lens from the first, posterior position to the second, anterior increased venting position can cause little to no change to a lens tilt and therefore little to no change of the angle of the OCL relative to the user's LOS when in a straight ahead viewing position. As another example, the movement range of the lens from the first position to the second, anterior increased venting position can cause little to no change to a vertical shift relative to a user's LOS and therefore little to no change to center of the lens relative to the user's LOS when in a straight-ahead viewing position. In some embodiments, the movement range of the lens from the first, posterior position to the second, anterior increased venting position can be primarily anteriorly relative to the user substantially without tilt or inferior-superior axis translation of the lens.

Moreover, venting can be enhanced by increasing both the area of the air inlet as well as the area of the air outlet. For example, the movement range of the lens from a first, posterior position to a second, anterior increased venting position can horizontally shift both an upper (or top) edge of the lens or frame and the lower (or bottom) edge of the lens or frame anteriorly relative to the user. In some embodiments, the horizontal shift of the upper edge of the lens can be generally equal to the horizontal shift of the lower edge of the lens when in a straight-ahead viewing position.

Some examples of headworn supports, such as eyewear, disclosed herein are configured to provide dynamic venting by allowing a user to manipulate components of the eyewear to shift the eyewear relative to the user's eyes. In certain implementations, the components which can be manipulated by the user include the nosepiece which can be movable relative to other components of the eyewear such as the frame and/or lens. For example, the nosepiece can be manipulated by utilizing a control or actuator positioned on the eyewear which is operably coupled to the nosepiece. In certain implementations, this actuator can be operated while the eyewear is being worn by the user and/or can be operated with one hand. Thus, the headworn support provided herein can provide for adjustable venting while the eyewear is being worn by the user. This can beneficially allow the user to make "on-the-fly" adjustments to venting, for example, while the user is engaged in an activity. This can be advantageous in situations, such as biking, driving, rowing, and other such activities, where removing the eyewear could be difficult. Moreover, the headworn support provided herein can allow a user to adjust venting with one hand while utilizing the user's other hand to operate other devices. This can be particularly advantageous during activities such as strenuous bike riding in which a user may wish to maintain one hand on the bike's handlebar. In some implementations, the user can make the "on-the-fly" adjustment to venting while the nosepiece remains seated at the same general position on the user's nose such that, when the nosepiece is moved, other components of the eyewear such as the frame and/or lens moves relative to the user's face. For example, the nosepiece can remain seated on the user's nose without a substantial shift in the horizontal and/or vertical directions. In some instances, the nosepiece can remain seated on the user's nose without any shift in the horizontal and/or vertical directions. It is to be understood that the nosepiece can rotate and/or translate slightly on the user's nose while remaining seated at the same general position on the user's nose.

Moreover, it is to be understood that, in some embodiments, components of the eyewear, such as the nosepiece assemblies, and changes in geometry between the eyewear and the user can beneficially maintain desirable optical qualities and fit when switched between multiple users. For example, the nosepiece assemblies can advantageously provide desirable optical qualities and fit in a first configuration when worn by a first user and desirable optical qualities and fit in a second configuration when worn by a second user whose facial structure differs from that of the first user.

Overview of Eyewear Configurations

FIGS. 1-8, 23, and 24 are illustrations of various embodiments of eyewear 100, 200, 300, 400 in the form of eyeglasses. As shown in the illustrated embodiments, the eyewear 100, 200, 300, 400, 1000 can include one or more supports 110, 210, 310, 410, 1010. In some embodiments, the supports 110, 210, 310, 410, 1010 can be configured to be supported on a head of a user or wearer.

As shown in the illustrated embodiments, the eyewear 100, 200, 300, 400, 1000 can also include one or more nosepiece assemblies 150, 250, 350, 450, 1050 coupled to, formed on, or integrated into the one or more supports 110, 210, 310, 410, 1010. In some embodiments, the one or more nosepiece assemlies 150, 250, 350, 450, 1050 can be configured to retain the eyewear 100, 200, 300, 400, 1000 on the user's face in at least two configurations to allow the user to adjust the amount of venting of the eyewear 100, 200, 300, 400, 1000. This can be beneficial in that the amount of venting of eyewear 100, 200, 300, 400, 1000 can be adjusted depending on current operating conditions (e.g., amount of condensation, rate of generation of condensation, environmental conditions) and user's comfort.

For example, the one or more nosepiece assemblies 150, 250, 350, 450, 1050 can be configured to retain the eyewear 100, 200, 300, 400, 1000 on the user's nose and transition from a first configuration to a second configuration. This transition from the first configuration to the second configuration can include translation and/or rotation of the one or more nosepiece assemblies 150, 250, 350, 450, 1050 relative to other components of the eyewear 100, 200, 300, 400, 1000, such as the support 110, 210, 310, 410, 1010. In some embodiments, the transition from the first configuration to the second configuration can allow one or more components of the eyewear 100, 200, 300, 400, 1000 to shift generally anteriorly relative to the user's face.

As shown in the illustrated embodiments, the eyewear 100, 200, 300, 400, 1000 can also include one or more lenses (and/or displays) 160, 260, 360, 460, 1060. As shown in FIGS. 1, 3-8, 23, and 24, the one or more nosepiece assemblies 150, 350, 450, 1050 can be attached to components of the supports 110, 310, 410, 1010, such as frames or faces 140, 340, 440, 1050, and/or the one or more lenses 160, 360, 460, 1060. The frames 140, 340, 440, 1040 can be configured to couple to the lenses 160, 360, 460, 1060. As shown in FIG. 2, the one or more nosepiece assemblies 250 can be attached directly to the one or more lenses 260.

The dynamic venting systems described herein can be applied to embodiments of eyeglasses with unitary lenses, dual lenses, partial orbitals, and full orbitals as well as other types of eyewear such as, but not limited to, goggles. Moreover, the dynamic venting systems described herein can be applied to other types of headworn supports such as, but not limited to, helmets, face masks, balaclavas, and breaching shields. In some embodiments, the eyewear or other headworn support can include a contact member which contacts the user's face in at least the first or posterior configuration. In some embodiments, the contact member can be formed from a fluid impermeable material, such as rubber or silicone, to reduce or inhibit airflow between the user's face and the periphery of the eyewear. This can be advantageous in situations where such airflow may be undesirable. In some embodiments, the contact member can be formed from a permeable material, such as foam, to allow some airflow between the user's face and the periphery of the eyewear while reducing or inhibiting foreign objects from passing through the contact member. This can be advantageous in situations where filtering particulates may be useful (e.g., highly dusty environment).

As noted above, the one or more nosepiece assemblies 150, 250, 350, 450, 1050 can be coupled to portions of the supports 110, 210, 310, 410, 1010, such as frames 140, 340, 440, 1040. In some embodiments, the nosepiece assemblies 150, 250, 350, 450, 1050, the supports 110, 210, 310, 410, 1010, and/or the lenses 160, 260, 360, 460, 1060 can be modular and interchangeable. This can beneficially allow a user to remove the nosepiece assembly from the support 110, 210, 310, 410, 1010 in instances where the user does not desire to use the nosepiece assembly. Moreover, this can beneficially allow a user to swap between nosepiece assemblies and/or supports as desired. For example, the user can have a single support and two or more nosepiece assemblies which provide different structures, operating mechanisms, and/or geometries. The user can swap between the various nosepiece assemblies as desired. As another example, the user can have a single nosepiece assembly and two or more supports which provide different structures and/or geometries. The user can swap the nosepiece assembly between various supports. In some embodiments, the user can swap between a dynamic nosepiece assembly and a static nosepiece assembly.

In some embodiments, the nosepiece assemblies 150, 250, 350, 450, 1050 can be retrofitted onto existing eyewear. For example, the nosepiece assemblies 150, 250, 350, 450, 1050 can include components such as nosepieces 152, 252, 352, 452, 1052, mechanisms 154, 254, control or actuators 354, 454, 1054, intermediate components 456, and/or traction members 358, 458, 1058. The retrofittable nosepiece assemblies can include mounting units which can be used to attach these components to an existing support. The mounting units can be attached to the existing support. These mounting units can include apertures, slots, or cavities 340a, 340c, 440a, 440d which can allow the components of the nosepiece assemblies 150, 250, 350, 450 to be attached to an existing support.

Embodiment of Dynamic Venting System on Support

Figure 2:
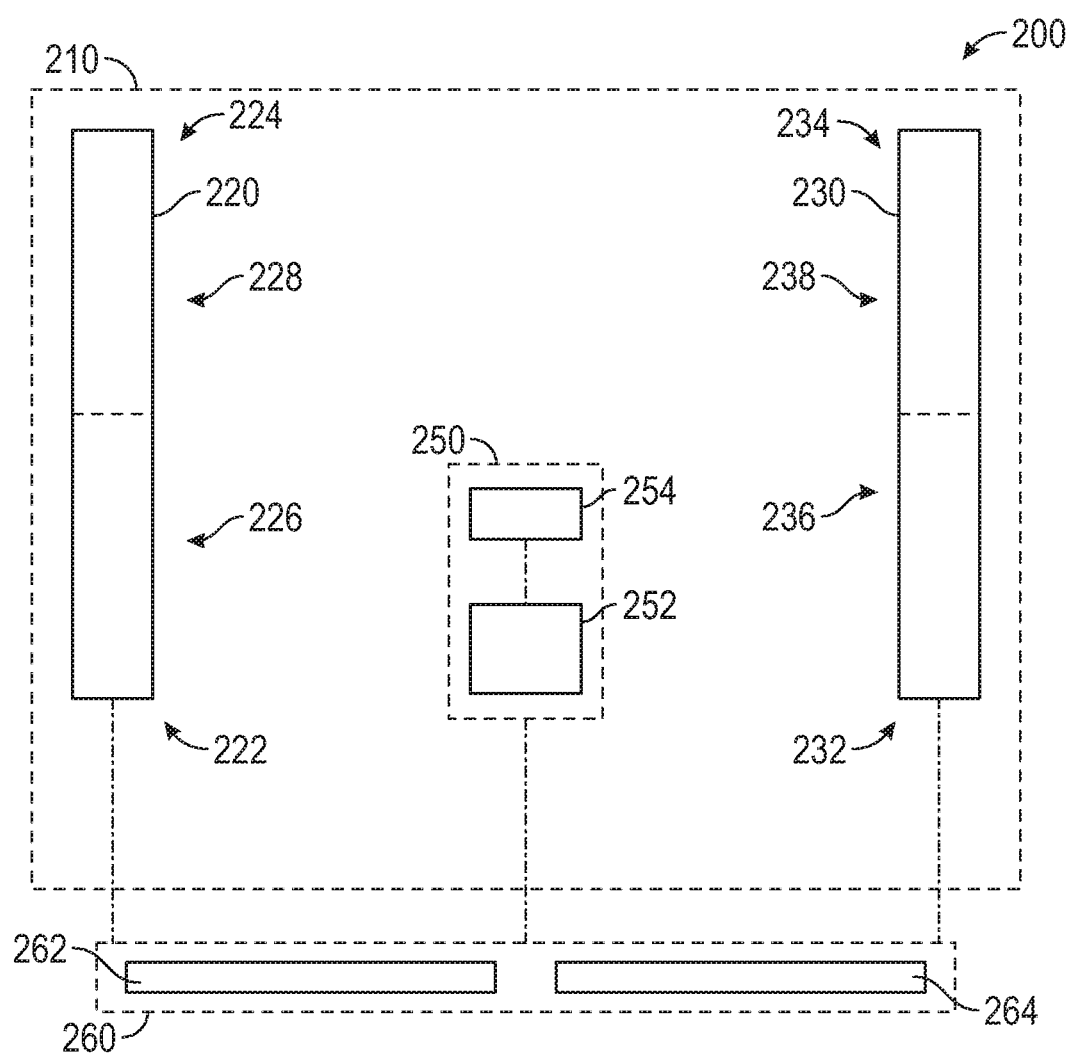
FIG. 2 illustrates a schematic of another embodiment of an eyewear having a dynamic venting system.

With reference first to FIG. 1, an embodiment of an eyewear 100 in the form on an eyeglass is illustrated having a support 110. The support 110 can include a right earstem 120, a left earstem 130, a frame or face 140 and a nosepiece assembly 150. The right earstem 120 can include an anterior end 122, a posterior end 124, an anterior portion 126, and a posterior portion 128. The left earstem 130 can similarly include an anterior end 132, a posterior end 134, an anterior portion 136, and a posterior portion 138. The frame 140 can include a right side 142 and a left side 144 and be configured to support a lens 160, such as a right lens 162 and left lens 164. In some embodiments, the frame 140 can be configured to surround at least a portion or an entirety of the periphery of the lens 160 such as lenses 162, 164. For example, the frame 140 can include partial or full orbitals. In some embodiments, the frame 140 can extend along an upper periphery of the lens 160 such as lenses 160, 162 (i.e., an upper frame) or can extend along a lower periphery of the lens 160 such as lenses 160, 162 (i.e., a lower frame). The nosepiece assembly 150 can include one or more nosepieces 152 configured to hold the support 110 on a user's face when in an as-worn configuration.

The nosepiece assembly 150 can be transitioned from a first configuration to a second configuration to move the one or more nosepieces 152 from a first position to a second position relative to the support 110. For example, in some embodiments, the nosepiece 152 can be translated and/or rotated relative to the frame 140 and/or lens 160. In some embodiments, the nosepiece assembly 150 can be transitioned from a first configuration to a second configuration to move the one or more nosepiece 152 via shape change of one or more components of the nosepiece assembly 150. For example, the one or more nosepieces 152 and/or other components of the nosepiece assembly 150 can incorporate materials capable of deforming from a first shape to a second shape including, but not limited to, metals such as shape memory metals and alloys (e.g., nitinol), steel, titanium, polymers such as shape memory polymers (e.g., linear block copolymers, thermoplastic polymers, crosslinked polyurethane), plastic, and any other material. In some embodiments, the shape change can occur as a result of an environmental trigger such as, but not limited to, a temperature change, an electrical change, a change in magnetic field, and the like.

In some embodiments, the nosepiece assembly 150 can include one or more mechanisms 154 to transition the nosepiece assembly 150 from the first configuration to the second configuration. The one or more mechanisms 154 can include controls or actuators such as, but is not limited to, switches, levers, buttons, knobs, slides, living hinges, and the like. In some embodiments, the one or more mechanisms 154 can include a trigger for allowing the nosepieces 152 and/or other components of the nosepiece assembly 150 to change from a first shape to a second shape. For example, the one or more mechanisms 154 can include triggering devices which can cause a change in temperature, electrical charge, and/or magnetic field to trigger the shape change. A control can be located on the eyewear 100 to control operation of the triggering device. The one or more mechanisms 154 can be positioned along portions of the eyewear 100 which facilitate user operation. For example, the one or more mechanisms 154 can be positioned forward of the frame 140 and/or lens 160, above or proximate a brow of the frame 140, and/or proximate a lateral region of the frame 140 and/or lens 160.

The nosepiece assembly 150 can be include one or more separate components which can be movable relative to each other. For example, the nosepiece assembly 150 can include a nosepiece 152, a mechanism 154 which can include a control. In some embodiments, the nosepiece 152 and the mechanism 154 can be operably coupled such that movement of the control can cause movement of the nosepiece 152 or vice-versa. For example, in some embodiments, the nosepiece assembly 150 can include a two-bar linkage coupled to the frame 140 and/or lens 160. The nosepiece 152 can be coupled to the frame 140 and/or lens 160 along a bottom region of the nosepiece 152 and coupled to the mechanism 154 along a top region of the nosepiece 152.

In some embodiments, the nosepiece 152 can include a lower medio-lateral axis of rotation which is at the coupling between the nosepiece 152 and the frame 140. However, it is to be understood that the lower axis of rotation can be at a location other than the coupling between the nosepiece 152 and the frame 140. In some embodiments, the lower axis of rotation can be no higher than about 30% of the distance from the bottom edge of the nosepiece 152 to the top edge of the nosepiece 152, no higher than about 20% of the distance from the bottom edge of the nosepiece 152 to the top edge of the nosepiece 152, generally no higher than 15% of the distance from the bottom edge of the nosepiece 152 to the top edge of the nosepiece 152, generally no higher than 10% of the distance from the bottom edge of the nosepiece 152 to the top edge of the nosepiece 152, generally no higher than 5%, of the distance from the bottom edge of the nosepiece 152 to the top edge of the nosepiece 152.

In some embodiments, the nosepiece 152 can include an upper medio-lateral axis of rotation which is at the coupling between the nosepiece 152 and the mechanism 154. However, it is to be understood that the upper axis of rotation can be at a location other than the coupling between the nosepiece 152 and the mechanism 154. In some embodiments, the upper axis of rotation can be no lower than about 30% of the distance from the top edge of the nosepiece 152 to the bottom edge of the nosepiece 152, no lower than about 20% of the distance from the top edge of the nosepiece 152 to the bottom edge of the nosepiece 152, no lower than about 15% of the distance from the top edge of the nosepiece 152 to the bottom edge of the nosepiece 152, no lower than about 10% of the distance from the top edge of the nosepiece 152 to the bottom edge of the nosepiece 152, no lower than about 5% of the distance from the top edge of the nosepiece 152 to the bottom edge of the nosepiece 152.

The mechanism 154 can be coupled to the frame 140 and/or lens 160. Accordingly, rotation of the mechanism 154 can cause the nosepiece 152 to rotate relative to other components of the eyewear 100, such as the frame 140 and/or lens 160, and vice-versa. It is to be understood that the couplings can be reversed (e.g. the nosepiece 152 can be coupled to the frame 140 and/or lens 160 along a top region of the nosepiece 152 and coupled to the mechanism 154 along a bottom region of the nosepiece 152).

In some embodiments, the nosepiece 152 can be coupled to the mechanism 154 via one or more intermediate components such as another bar. For example, nosepiece 152 can be coupled to the frame 140 and/or lens 160 along a bottom region of the nosepiece 152 and coupled to an end of an intermediate component along a top region of the nosepiece 152. The intermediate component can be pivotally to the mechanism 154 at an opposite end of the intermediate component. Accordingly, movement (i.e., rotation and/or translation) of the mechanism 154 can cause the intermediate component to rotate thereby rotating the nosepiece 152 relative to other components of the eyewear 100, such as the frame 140 and/or lens 160, and vice-versa. For example, the nosepiece assembly 150 can include a slider-rocker linkage with the mechanism 154 being translatable relative to the frame 140 and/or lens 160. Translation of the mechanism 154 can cause rotation of the intermediate component which rotates the nosepiece 152 relative to other components of the eyewear 100, such as the frame 140 and/or lens 160. It is to be understood that the couplings can be reversed (e.g. the nosepiece 152 can be coupled to the frame 140 and/or lens 160 along a top region of the nosepiece 152 and coupled to the intermediate component along a bottom region of the nosepiece 152).

As shown in the illustrated embodiment, the right earstem 120, the left earstem 130, and/or the nosepiece assembly 150 can be coupled to the frame 140 and/or the lens 160. For example, the right earstem 120 can be coupled to the right side 142 of the frame 140 at or proximate an anterior end 122 of the right earstem 120, the left earstem 130 can be coupled to the left side 144 of the frame 140 at or proximate an anterior end 132 of the left earstem 130, and the nosepiece assembly 150 can be coupled to a portion of the frame 140 between the right and left sides 142, 144 and/or the lens 160 between lateral sides of the lens 160 or between two separate lenses, such as right and left lenses 162, 164. In some embodiments, the right earstem 120 and/or the left earstem 130 can be permanently affixed to the frame 140 and/or the lens 160. A permanent attachment of the earstems, such as right and/or left earstems 120, 130, to the frame 140 and/or the lens 160 may be accomplished, for example, through molding or thermoplastic bonding. As shown in FIG. 1, the nosepiece assembly 150 can be coupled to the frame 140. However, it is to be understood that the nosepiece assembly 150 can be coupled to the lens 160 in addition to, or in lieu of, coupling with the frame 140. In some embodiments, the right earstem 120, the left earstem 130, and/or the nosepiece 146*a* can be rotatably coupled to the frame 140 via a rotatable coupling such as, but not limited to, a snap fit coupling or fasteners including screws or pins or any other rotatable coupling as desired.

In some embodiments where the right and/or left earstems 120, 130 are rotatably coupled to the frame 140 and/or the lens 160, the right and/or left earstems 120, 130 can rotate from an open position, in which the eyewear 100 can be worn by a user, to a closed position, in which the eyewear 100 takes on a more compact form factor for storage, and vice versa.

Embodiment of Dynamic Venting System on Frameless or Rimless Support

With reference next to FIG. 2, an embodiment of an eyewear 200 is illustrated having a support 210. The eyewear 200 can include or share any or all of the components, features and/or characteristics described above in connection with eyewear 100.

The support 210 can include a right earstem 220, a left earstem 230, and a nosepiece assembly 250. The right earstem 220 can include an anterior end 222, a posterior end 224, an anterior portion 226, and a posterior portion 228. The left earstem 230 can similarly include an anterior end 232, a posterior end 234, an anterior portion 236, and a posterior portion 238. The nosepiece assembly 250 can include one or more nosepieces 252 configured to hold the support 210 on a user's face when in an as-worn configuration.

The nosepiece assembly 250 can be transitioned from a first configuration to a second configuration to move the one or more nosepieces 252 from a first position to a second position relative to the support 210. For example, in some embodiments, the nosepiece 252 can be translated and/or rotated relative to the lens 260. In some embodiments, the nosepiece assembly 250 can be transitioned from a first configuration to a second configuration to move the one or more nosepiece 252 via shape change of one or more components of the nosepiece assembly 250. For example, the one or more nosepieces 252 and/or other components of the nosepiece assembly 250 can incorporate materials capable of deforming from a first shape to a second shape including, but not limited to, metals such as shape memory metals and alloys (e.g., nitinol), steel, titanium, polymers such as shape memory polymers (e.g., linear block copolymers, thermoplastic polymers, crosslinked polyurethane), plastic, and any other material. In some embodiments, the shape change can occur as a result of an environmental trigger such as, but not limited to, a temperature change, an electrical change, a change in magnetic field, and the like.

In some embodiments, the nosepiece assembly 250 can include one or more mechanisms 254 to transition the nosepiece assembly 250 from the first configuration to the second configuration. The one or more mechanisms 254 can include controls or actuators such as, but is not limited to, switches, levers, buttons, knobs, slides, living hinges, and the like. In some embodiments, the one or more mechanisms 254 can include a trigger for allowing the nosepieces 252 and/or other components of the nosepiece assembly 250 to change from a first shape to a second shape. For example, the one or more mechanisms 254 can include triggering devices which can cause a change in temperature, electrical charge, and/or magnetic field to trigger the shape change. A control can be located on the eyewear 200 to control operation of the triggering device. The one or more mechanisms 254 can be positioned along portions of the eyewear 200 which facilitate user operation. For example, the one or more mechanisms 254 can be positioned forward of the lens 260, above or proximate an upper edge of the lens 260, and/or proximate a lateral region of the lens 260.

The nosepiece assembly 250 can be include one or more separate components which can be movable relative to each other. For example, the nosepiece assembly 250 can include a nosepiece 252 and a mechanism 254 which can include a control. In some embodiments, the nosepiece 252 and the mechanism 254 can be operably coupled such that movement of the mechanism 254 can cause movement of the nosepiece 252 or vice-versa. For example, in some embodiments, the nosepiece assembly 250 can include a two-bar linkage coupled to the lens 260. The nosepiece 252 can be coupled to the lens 260 along a bottom region of the nosepiece 252 and coupled to the mechanism 254 along a top region of the nosepiece 252.

In some embodiments, the nosepiece 252 can include a lower medio-lateral axis of rotation which is at the coupling between the nosepiece 252 and the frame 240. However, it is to be understood that the lower axis of rotation can be at a location other than the coupling between the nosepiece 252 and the lens 260. In some embodiments, the lower axis of rotation can be no higher than about 30% of the distance from the bottom edge of the nosepiece 252 to the top edge of the nosepiece 252, no higher than about 20% of the distance from the bottom edge of the nosepiece 252 to the top edge of the nosepiece 252, generally no higher than 15% of the distance from the bottom edge of the nosepiece 252 to the top edge of the nosepiece 252, generally no higher than 10% of the distance from the bottom edge of the nosepiece 252 to the top edge of the nosepiece 252, generally no higher than 5%, of the distance from the bottom edge of the nosepiece 252 to the top edge of the nosepiece 252.

In some embodiments, the nosepiece 252 can include an upper medio-lateral axis of rotation which is at the coupling between the nosepiece 252 and the mechanism 254. However, it is to be understood that the upper axis of rotation can be at a location other than the coupling between the nosepiece 252 and the mechanism 254. In some embodiments, the upper axis of rotation can be no lower than about 30% of the distance from the top edge of the nosepiece 252 to the bottom edge of the nosepiece 252, no lower than about 20% of the distance from the top edge of the nosepiece 252 to the bottom edge of the nosepiece 252, no lower than about 15% of the distance from the top edge of the nosepiece 252 to the bottom edge of the nosepiece 252, no lower than about 10% of the distance from the top edge of the nosepiece 252 to the bottom edge of the nosepiece 252, no lower than about 5% of the distance from the top edge of the nosepiece 252 to the bottom edge of the nosepiece 252.

The mechanism 254 can be coupled to the lens 260. Accordingly, rotation of the mechanism 254 can cause the nosepiece 252 to rotate relative to other components of the eyewear 200, such as the lens 260, and vice-versa. It is to be understood that the couplings can be reversed (e.g. the nosepiece 252 can be coupled to the lens 260 along a top region of the nosepiece 252 and coupled to the mechanism 254 along a bottom region of the nosepiece 252).

In some embodiments, the nosepiece 252 can be coupled to the mechanism 254 via one or more intermediate components such as another bar. For example, nosepiece 252 can be coupled to the lens 260 along a bottom region of the nosepiece 252 and coupled to an end of an intermediate component along a top region of the nosepiece 252. The intermediate component can be coupled to the mechanism 254 at an opposite end of the intermediate component. Accordingly, movement (i.e., rotation and/or translation) of the mechanism 254 can cause the intermediate component to rotate thereby rotating the nosepiece 252 relative to other components of the eyewear 200, such as the lens 260, and vice-versa. For example, the nosepiece assembly 250 can include a slider-rocker linkage with the mechanism 254 being translatable relative to the lens 260. Translation of the mechanism 254 can cause rotation of the intermediate component which rotates the nosepiece 252 relative to other components of the eyewear 200, such as the lens 260. It is to be understood that the couplings can be reversed (e.g. the nosepiece 252 can be coupled to the lens 260 along a top region of the nosepiece 252 and coupled to the intermediate component along a bottom region of the nosepiece 252).

As shown in the illustrated embodiment, the right earstem 220, the left earstem 230, and/or the nosepiece assembly 250 can be coupled to the lens 260. For example, the right earstem 220 can be coupled to a right side of the lens 260 (or to the right lens 262) at or proximate an anterior end 222 of the right earstem 220, the left earstem 230 can be coupled to the left side of the lens 260 (or to the left lens 264) at or proximate an anterior end 232 of the left earstem 230, and the nosepiece assembly 250 can be coupled to a portion of the lens 260 between lateral sides of the lens 260 or between two separate lenses, such as right and left lenses 262, 264. In some embodiments, the right earstem 220 and/or the left earstem 230 can be permanently affixed to the lens 260. A permanent attachment of the earstems, such as right and/or left earstems 220, 230 to lens 260 may be accomplished, for example, through molding or thermoplastic bonding. In some embodiments, the right earstem 220, the left earstem 230, and/or the nosepiece assembly 250 can be rotatably coupled to the lens 260 via a rotatable coupling such as, but not limited to, a snap fit coupling or fasteners including screws or pins or any other rotatable coupling as desired. Other examples of couplings between the right earstem 220, the left earstem 230, and the lens 260 can be found in U.S. Pat. Nos. 9,122,078 and 9,188,792 and U.S. Publication No. 2016/0216533, the entireties of each of which are hereby expressly incorporated by reference herein.

In some embodiments where the right and/or left earstems 220, 230 are rotatably coupled to the lens 260, the right and/or left earstems 220, 230 can rotate from an open position, in which the eyewear 200 can be worn by a user, to a closed position, in which the eyewear 200 takes on a more compact form factor for storage, and vice versa.

Embodiments of Dynamic Venting System with Lever Switch

Figure 3:
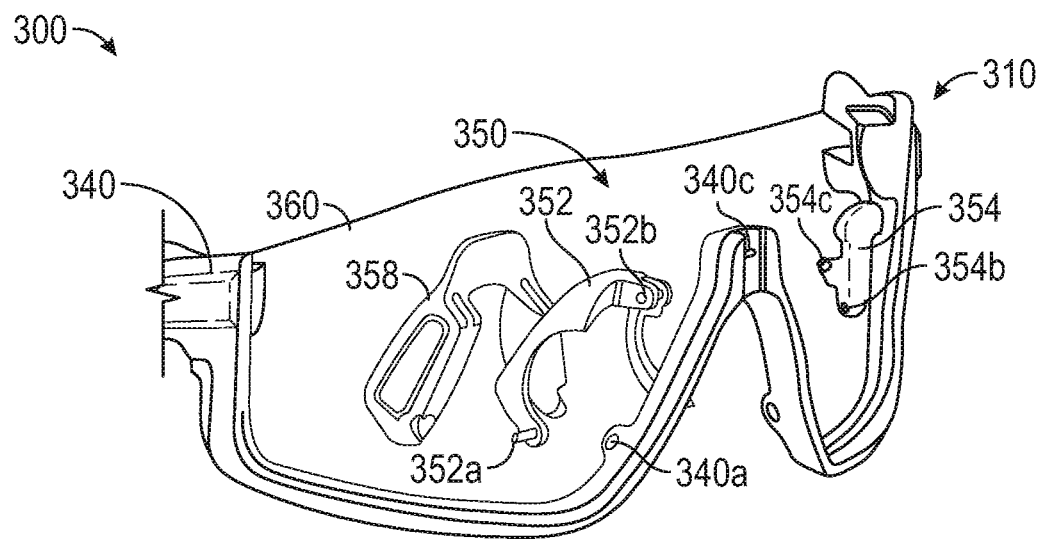
FIG. 3 illustrates a perspective view of components of an embodiment of an eyewear having a dynamic venting system, the components of the eyewear shown in an exploded configuration.
Figures 4, 5:
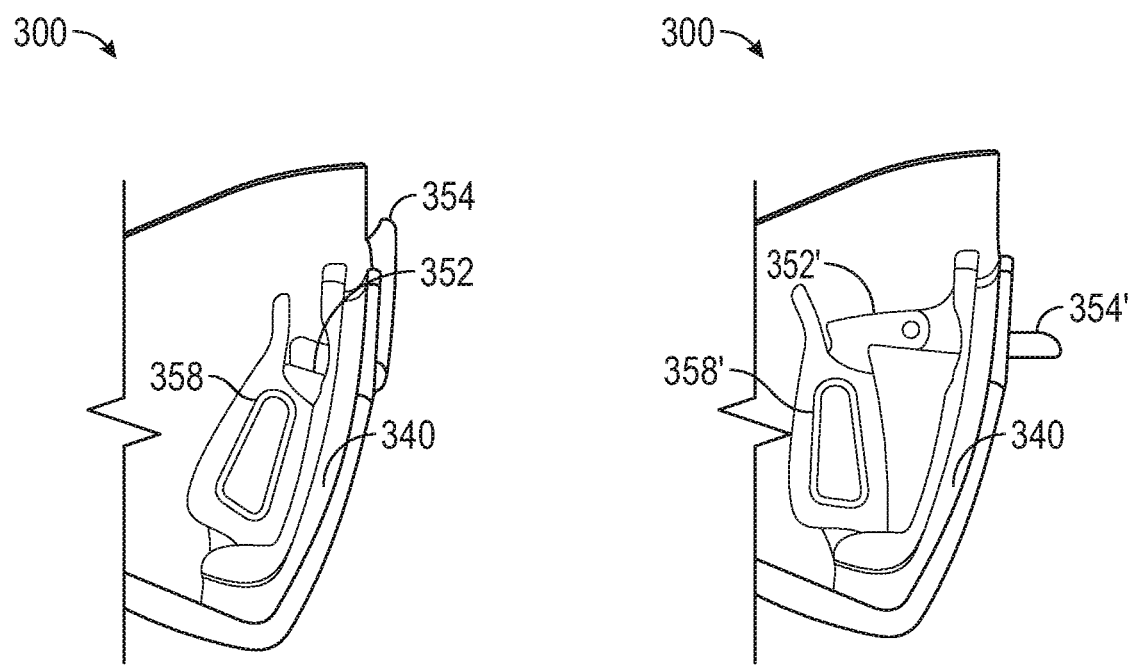
FIG. 4 illustrates a side view of the eyewear of FIG. 3, the nosepiece assembly being in a first configuration.
FIG. 5 illustrates a side view of the eyewear of FIG. 3, the nosepiece assembly being in a second configuration.

With reference next to FIGS. 3-5, an embodiment of an eyewear 300 is illustrated having a support 310. The eyewear 300 can include or share any or all of the components, features and/or characteristics described above in connection with any of the eyewear described herein, such as eyewear 100, 200.

With reference first to FIG. 3 which is a perspective view of the eyewear 300, the eyewear 300 can include a support 310 having right and left earstems (not shown), a frame or face 340, and a nosepiece assembly 350. The nosepiece assembly 350 can support the eyewear 300 on the nose of a user. The eyewear 300 can include a unitary lens 360; however, it is to be understood that the eyewear 300 can include more than a single lens (e.g., a dual-lens eyewear). Moreover, although the frame 300 is shown extending along a bottom periphery of the lens 360, it is to be understood that the frame 340 can extend along a top periphery of the lens 360 in combination with, or in lieu of, the portion which extends along a bottom periphery of the lens 360.

As shown in the illustrated embodiment, the nosepiece assembly 350 can include multiple components. The nosepiece assembly 350 can include a nosepiece 352, a control or actuator 354. In some embodiments, such as that shown, the nosepiece assembly 350 can also include a traction member 358 which can be coupled to the nosepiece 352 to provide for enhanced grip on a user's nose. Traction members can also be included for other portions of the support 310, such as the earstems. Examples of such traction members are described in further detail in U.S. Pat. No. 8,262,219 and U.S. application Ser. No. 15/372,814, the entireties of each of which are hereby expressly incorporated by reference herein.

In some embodiments, the nosepiece 352 can be operably coupled to the frame 340. As shown, the nosepiece 352 can include a protrusion or pin 352a which is received within an aperture or cavity 340a of the frame 340 or vice-versa (i.e., the nosepiece 352 can include an aperture or cavity to receive a protrusion or pin of the frame 340). The nosepiece 352 can be rotated relative to frame 340 along an axis of protrusion or pin 352a. This axis (i.e., "nosepiece axis") can be parallel to an anatomical medio-lateral axis. In some embodiments, the nosepiece 352 can be operably coupled to the control 354. As shown, the nosepiece 352 can include an aperture or cavity 352b which can receive a pin (not shown) which passes through aperture or cavity 354b of the control 354. The nosepiece 352 and the control 354 can be rotated relative to each other along an axis of the pin coupling the nosepiece 352 and the control 354. This axis (i.e., "nosepiece-control axis") can be parallel to an anatomical medio-lateral axis. In some embodiments, the control 354 can be rotatably coupled to the frame 340. As shown, the control 354 can include a protrusion or pin 354c which is received within an aperture or cavity 340c of the frame 340 or vice-versa (i.e., the control 354 can include an aperture or cavity to receive a protrusion or pin of the frame 340). The control 354 can be rotated relative to frame 340 along an axis of protrusion or pin 354c. This axis (i.e., "control axis") can be parallel to an anatomical medio-lateral axis.

As shown, the nosepiece 352 is coupled to the frame 340 along a lower portion of the nosepiece 352; however, it is to be understood that the nosepiece 352 can be coupled to the frame 340 along other portions of the nosepiece 352. In some embodiments, the nosepiece 352 can be coupled to the frame 340 along a middle or upper portion of the nosepiece 352. Additionally, although the nosepiece 352 is shown coupled to a lower portion of the frame 340, it is to be understood that the nosepiece 352 can be coupled to other locations of the frame 340. In some embodiments, the nosepiece 352 can be coupled to the middle or upper portion of the frame 340, and/or other locations of the eyewear 300, such as the lens 360.

As shown, the control 354 is coupled to the frame 340 along a middle portion of the control 354; however, it is to be understood that the control 354 can be coupled to the frame 340 along other portions of the control 354. In some embodiments, the control 354 can be coupled to the frame 340 along a lower or upper portion of the control 354. Additionally, although the control 354 is shown coupled to a middle portion of the frame 340, it is to be understood that the control 354 can be coupled to other locations of the frame 340. In some embodiments, the control 354 can be coupled to the lower or upper portion of the frame 340, and/or other locations of the eyewear 300, such as the lens 360.

With reference next to FIGS. 4 and 5 which are side views of the eyewear 300, the transition from a first, posterior configuration to a second, anterior increased venting configuration is illustrated. As shown in FIG. 4, the eyewear 300 is in a first, posterior configuration in which the nosepiece 352 is positioned proximate the frame 340 and lens 360 of the eyewear 300. As such, when worn on the head of a user with the nosepiece 352 supporting the eyewear on a nose of the user, frame 340 and lens 360 can be positioned closer to the head of the user as compared to the second, anterior increased venting configuration described in connection with FIG. 5 below. This configuration can provide for a lower degree of venting between the frame 340 and lens 360 and the user's face.

The user can transition the eyewear 300 to the second, anterior increased venting configuration shown in FIG. 5 by pulling downwardly on the control 354' such that the control 354' rotates towards a second position. As shown in the illustrated embodiment, the control 354' can rotate in a clockwise direction. In so doing, the pivot axis between the control 354' and the nosepiece 352' (represented by aperture or cavity 352b) can be shifted in a direction away from the frame 340. This shift in the pivot axis between the control 354' and the nosepiece 352' can cause the nosepiece 352' to rotate towards a second position. As shown in the illustrated embodiment, the nosepiece 352' can rotate in a counter-clockwise direction relative to the frame 340. In some embodiments, the user can transition the eyewear 300 back to the first, posterior configuration shown in FIG. 4 by pulling upwardly on the control 354 such that the control 354 rotates back to a first position shown in FIG. 4. In some embodiments, the user can transition the eyewear 300 back to the first, posterior configuration shown in FIG. 4 by pushing the eyewear 300 back towards the nosepiece 352 (e.g., towards the user's face). This can apply a force on the nosepiece 352 to rotate the nosepiece 352 back to the first position.

It is to be understood that the directionality of movement of components of the eyewear 300 can be different from that described above. In some embodiments, the movement of components described above can be reversed. This may be the case, for example, in embodiments where the nosepiece 352 is coupled to the frame 340 along a middle or upper portion of the nosepiece 352 and the control 354 is coupled to the frame 340 along a lower or middle portion of the control 354.

It is to be appreciated that the user can operate the control 354' with one hand thereby freeing the user's other hand for other activities (e.g., holding onto a handle of a bicycle, a steering wheel of an automobile, etc.). For example, the user can operate the control 354' using the user's thumb and index finger. Moreover, it is also to be appreciated that the user can operate the control 354' without having to remove the eyewear 300 from the user's face. In some implementations, the user can transition the eyewear 300 between the first and second positions while the nosepiece 352 and/or traction member 358 remains seated at the same general position on the user's nose such that, when the nosepiece 352 is moved, other components of the eyewear 300 such as the frame 340 and/or lens 360 moves relative to the user's face. For example, the nosepiece 352 and/or traction member 358 can remain seated on the user's nose without a substantial shift in the horizontal and/or vertical directions. In some instances, the nosepiece 352 and/or traction member 358 can remain seated on the user's nose without any shift in the horizontal and/or vertical directions. It is to be understood that the nosepiece 352 and/or traction member 358 can rotate slightly on the user's nose while remaining seated at the same general position on the user's nose.

Figure 23:
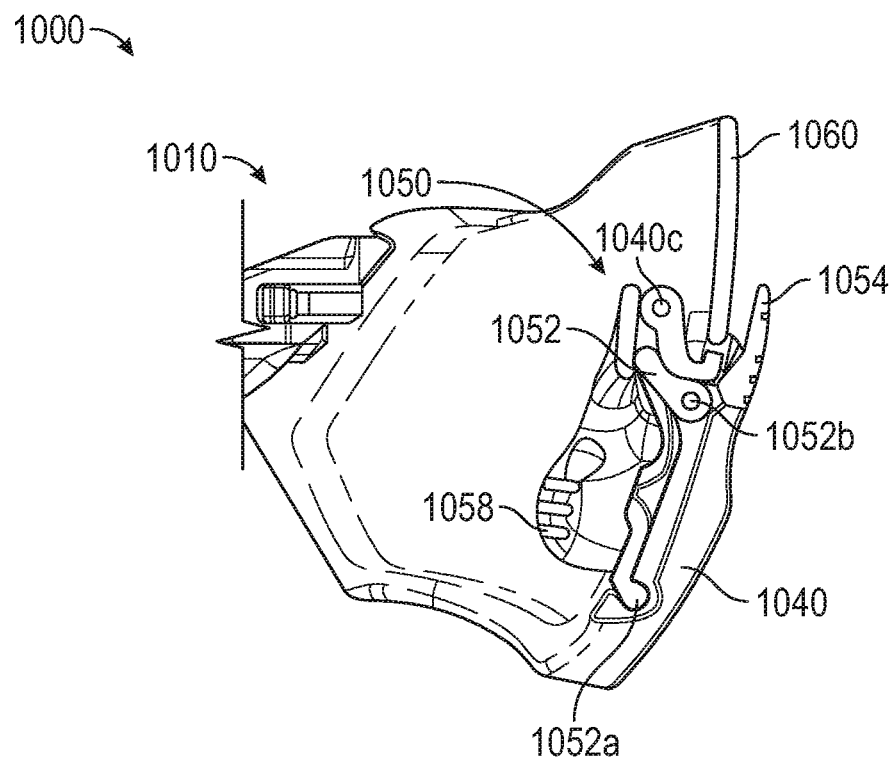
FIG. 23 illustrates a side view of components of an embodiment of an eyewear having a dynamic venting system, the nosepiece assembly being in a first configuration.
Figure 24:
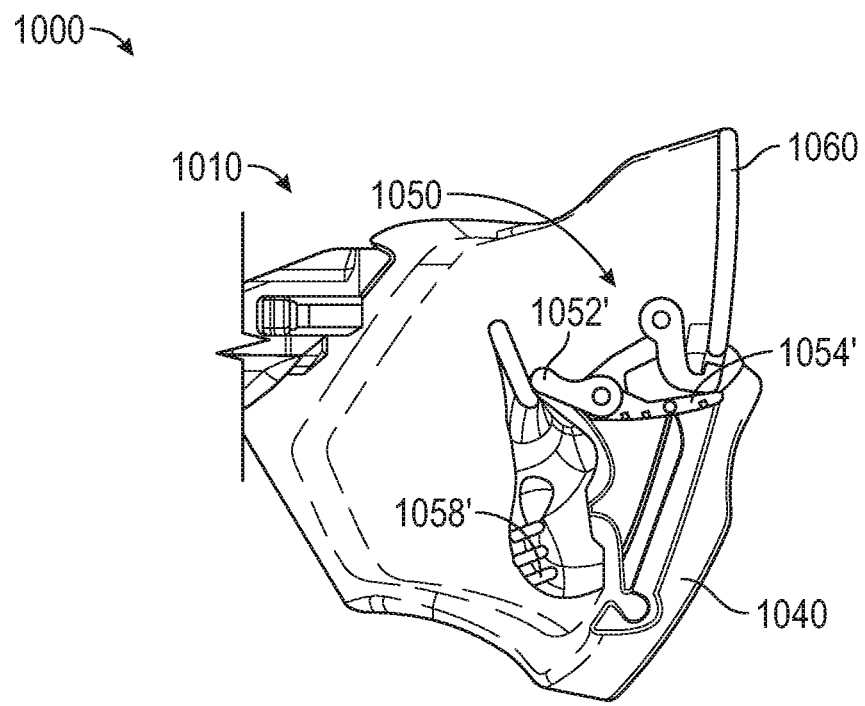
FIG. 24 illustrates a side view of components of the eyewear of FIG. 23, the nosepiece assembly being in a second configuration.

With reference next to FIGS. 23 and 24, an embodiment of an eyewear 1000 is illustrated having a support. The eyewear 1000 can include or share any or all of the components, features and/or characteristics described above in connection with any of the eyewear described herein, such as eyewear 100, 200, 300.

As shown in the illustrated embodiment, the eyewear 1000 can include a nosepiece assembly 1050. The nosepiece assembly 1050 can include a nosepiece 1052 and/or a control or actuator 1054. In some embodiments, such as that shown, the nosepiece assembly 1050 can also include a traction member 1058 which can be coupled to the nosepiece 1052 to provide for enhanced grip on a user's nose. Traction members can also be included for other portions of the support 1010, such as the earstems. Examples of such traction members are described in further detail in U.S. Pat. No. 8,262,219 and U.S. application Ser. No. 15/372,814, the entireties of each of which are hereby expressly incorporated by reference herein.

With continued reference to FIGS. 23 and 24 which are side views of the eyewear 1000, the transition from a first, posterior configuration to a second, anterior increased venting configuration is illustrated. As shown in FIG. 23, the eyewear 1000 is in a first, posterior configuration in which the nosepiece 1052 is positioned proximate the frame 1040 and lens 1060 of the eyewear 1000. As such, when worn on the head of a user with the nosepiece 1052 supporting the eyewear on a nose of the user, frame 1040 and lens 1060 can be positioned closer to the head of the user as compared to the second, anterior increased venting configuration described in connection with FIG. 24 below. This configuration can provide for a lower degree of venting between the frame 1040 and lens 1060 and the user's face.

The user can transition the eyewear 1000 to the second, anterior increased venting configuration shown in FIG. 24 by pulling downwardly on the control 1054' such that the control 1054' rotates towards a second position. As shown in the illustrated embodiment, the control 1054' can rotate in a clockwise direction around a pivot 1040c between the frame 1040 and the control 1054'. The control 1054' can include a protrusion or pin (not shown) which is received within an aperture or cavity 1040c of the frame 1040 or vice-versa (i.e., the control 1054' can include an aperture or cavity to receive a protrusion or pin of the frame 1040). The control 1054' can be rotated relative to frame 1040 along an axis of protrusion or pin which is received within the aperture or cavity 1040c. This axis (i.e., "control axis") can be parallel to an anatomical medio-lateral axis.

In moving the control 1054' towards the second position, the pivot axis between the control 1054' and the nosepiece 1052' (represented by aperture or cavity 1052b) can be shifted in a direction away from the frame 1040. This shift in the pivot axis between the control 1054' and the nosepiece 1052' can cause the nosepiece 1052' to rotate towards a second position around a pivot 1040a between the nosepiece 1052' and the frame 1040. For example, as shown, the nosepiece 1052 can include an aperture or cavity 1052b which can receive a pin (not shown) which passes through aperture or cavity (not shown) of the control 1054. As shown in the illustrated embodiment, the nosepiece 1052' can rotate in a counter-clockwise direction relative to the frame 1040. As shown, the nosepiece 1052' can include a protrusion or pin 1052a which is received within an aperture or cavity (not shown) of the frame 1040 or vice-versa (i.e., the nosepiece 1052' can include an aperture or cavity to receive a protrusion or pin of the frame 1040). The nosepiece 1052' can be rotated relative to frame 1040 along an axis of protrusion or pin 1052a. This axis (i.e., "nosepiece axis") can be parallel to an anatomical medio-lateral axis.

In some embodiments, the user can transition the eyewear 1000 back to the first, posterior configuration shown in FIG. 24 by pulling upwardly on the control 1054 such that the control 1054 rotates back to a first position shown in FIG. 24. In some embodiments, the user can transition the eyewear 1000 back to the first, posterior configuration shown in FIG. 24 by pushing the eyewear 1000 back towards the nosepiece 1052 (e.g., towards the user's face). This can apply a force on the nosepiece 1052 to rotate the nosepiece 1052 back to the first position.

It is to be understood that the directionality of movement of components of the eyewear 1000 can be different from that described above. In some embodiments, the movement of components described above can be reversed. This may be the case, for example, in embodiments where the nosepiece 1052 is coupled to the frame 1040 along a middle or upper portion of the nosepiece 1052 and the control 1054 is coupled to the frame 340 along a lower or middle portion of the control 1054.

It is to be appreciated that the user can operate the control 1054' with one hand thereby freeing the user's other hand for other activities (e.g., holding onto a handle of a bicycle, a steering wheel of an automobile, etc.). For example, the user can operate the control 1054' using the user's thumb and index finger. Moreover, it is also to be appreciated that the user can operate the control 1054' without having to remove the eyewear 1000 from the user's face. In some implementations, the user can transition the eyewear 1000 between the first and second positions while the nosepiece 1052 and/or traction member 1058 remains seated at the same general position on the user's nose. For example, the nosepiece 1052 and/or traction member 1058 can remain seated on the user's nose without a substantial shift in the horizontal and/or vertical directions. In some instances, the nosepiece 1052 and/or traction member 1058 can remain seated on the user's nose without any shift in the horizontal and/or vertical directions. It is to be understood that the nosepiece 1052 and/or traction member 1058 can rotate slightly on the user's nose while remaining seated at the same general position on the user's nose.

Embodiment of Dynamic Venting System with Button Switch

With reference next to FIGS. 6-8, an embodiment of an eyewear 400 is illustrated having a support 410. The eyewear 400 can include or share any or all of the components, features and/or characteristics described above in connection with any of the eyewear described herein, such as eyewear 100, 200, 300, 1000.

With reference first to FIG. 6 which is a perspective view of the eyewear 400, the eyewear 400 can include a support 410 having right and left earstems (not shown), a frame or face 440, and a nosepiece assembly 450. The nosepiece assembly 450 can support the eyewear 400 on the nose of a user. The eyewear 400 can include a unitary lens 460; however, it is to be understood that the eyewear 400 can include more than a single lens (e.g., a dual-lens eyewear). Moreover, although the frame 400 is shown extending along a bottom periphery of the lens 460 (i.e., a lower frame), it is to be understood that the frame 440 can extend along a top periphery of the lens 460 in combination with, or in lieu of, the portion which extends along a bottom periphery of the lens 460.

As shown in the illustrated embodiment, the nosepiece assembly 450 can include multiple components. The nosepiece assembly 450 can include a nosepiece 352, a control or actuator 354, and an intermediate component 456. In some embodiments, the nosepiece assembly 450 can also include a traction member 458 (FIGS. 7 and 8) which can be coupled to the nosepiece 452 to provide for enhanced grip on a user's nose. Traction members can also be included for other portions of the support 410, such as the earstems. Examples of such traction members are described in further detail in U.S. Pat. No. 8,262,219 and U.S. application Ser. No. 15/372,814, the entireties of each of which are hereby expressly incorporated by reference herein.

In some embodiments, the nosepiece 452 can be operably coupled to the frame 440. As shown, the nosepiece 452 can include a protrusion or ball 452a which is received within an aperture or cavity 440a of the frame 440 or vice-versa (i.e., the nosepiece 452 can include an aperture or cavity to receive a protrusion or pin of the frame 440). The nosepiece 452 can be rotated relative to frame 440 along an axis of protrusion or pin 452a. This axis (i.e., "nosepiece axis") can be parallel to an anatomical medio-lateral axis. In some embodiments, the nosepiece 452 can be operably coupled to the intermediate component 456. As shown, the nosepiece 452 can include an aperture or cavity 452b which can receive a pin (not shown) which passes through aperture or cavity 456b of the intermediate component 454. The nosepiece 452 and the intermediate component 456 can be rotated relative to each other along an axis of the pin coupling the nosepiece 452 and the intermediate component 456. This axis can be parallel to an anatomical medio-lateral axis.

In some embodiments, the intermediate component 456 can be operably coupled to the control 454. As shown, the intermediate component 456 can include an aperture or cavity 456c which can receive a pin (not shown) which passes through aperture or cavity 454c of the control 454. The intermediate component 456 and the control 454 can be rotated relative to each other along an axis of the pin coupling the intermediate component 456 and the control 454. This axis can be parallel to an anatomical medio-lateral axis. In some embodiments, the control 454 can be translatably coupled to the frame 440. As shown, the control 454 can include a protrusion or extension 454d which is received within a cavity or slot 440d of the frame 440 or vice-versa (i.e., the control 454 can include a cavity or slot to receive a protrusion or extension of the frame 440). The control 454 can be translated relative to frame 440 along an axis of protrusion or extension 454d. This axis (i.e., "control axis") can be generally parallel to an anatomical superior-inferior axis.

As shown, the nosepiece 452 is coupled to the frame 440 along a lower portion of the nosepiece 452; however, it is to be understood that the nosepiece 452 can be coupled to the frame 440 along other portions of the nosepiece 452. In some embodiments, the nosepiece 452 can be coupled to the frame 440 along a middle or upper portion of the nosepiece 452. Additionally, although the nosepiece 452 is shown coupled to a lower portion of the frame 440, it is to be understood that the nosepiece 452 can be coupled to other locations of the frame 440. In some embodiments, the nosepiece 452 can be coupled to the middle or upper portion of the frame 440, and/or other locations of the eyewear 400, such as the lens 460.

As shown, the control 454 is coupled to the frame 440 along a lower and/or middle portion of the control 454; however, it is to be understood that the control 454 can be coupled to the frame 440 along other portions of the control 454. In some embodiments, the control 454 can be coupled to the frame 440 along a middle and/or upper portion of the control 454. Additionally, although the control 454 is shown coupled to a middle portion of the frame 440, it is to be understood that the control 454 can be coupled to other locations of the frame 440. In some embodiments, the control 454 can be coupled to the lower or upper portion of the frame 440, and/or other locations of the eyewear 400, such as the lens 460.

With reference next to FIGS. 7 and 8 which are side views of the eyewear 400, the transition from a first, posterior configuration to a second, anterior increased venting configuration is illustrated. As shown in FIG. 7, the eyewear 400 is in a first, posterior configuration in which the nosepiece 452 is positioned proximate the frame 440 and lens 460 of the eyewear 400. As such, when worn on the head of a user with the nosepiece 452 supporting the eyewear on a nose of the user, frame 440 and lens 460 can be positioned closer to the head of the user as compared to the second, anterior increased venting configuration described in connection with FIG. 8 below. This configuration can provide for a lower degree of venting between the frame 440 and lens 460 and the user's face.

The user can transition the eyewear 400 to the second, anterior increased venting configuration shown in FIG. 8 by pressing downwardly on the control 454' such that the control 454' translates towards a second position. As shown in the illustrated embodiment, the control 454' can translate in a downward direction. In so doing, the pivot axis between the control 454' and the intermediate component 456' can be shifted in a direction towards the user. This shift in the pivot axis between the control 454' and the intermediate component 456' can cause the intermediate component 356' to rotate towards a second position. As shown in the illustrated embodiment, the intermediate component 456' can rotate in a clockwise direction relative to the frame 440. The rotation of the intermediate component 456' can cause the pivot axis between the intermediate component 456' and the nosepiece 452' to shift relative to other portions of the eyewear 400, such as the frame 440. This shift in the pivot axis between the intermediate component 456' and the nosepiece 452' can cause the nosepiece 452' to rotate towards a second position. As shown in the illustrated embodiment, the nosepiece 452' can rotate in a counter-clockwise direction relative to the frame 440.

In some embodiments, the user can transition the eyewear 400 back to the first, posterior configuration shown in FIG. 7 by pulling upwardly on the control 454 such that the control 454 rotates back to a first position shown in FIG. 7. In some embodiments, the user can transition the eyewear 400 back to the first, posterior configuration shown in FIG. 7 by pushing the eyewear 400 back towards the user's face. This can apply a force on the nosepiece 452 to rotate the nosepiece 452 back to the first position.

It is to be understood that the directionality of movement of components of the eyewear 400 can be different from that described above. In some embodiments, the movement of components described above can be reversed. This may be the case, for example, in embodiments where the nosepiece 452 is coupled to the frame 440 along a middle or upper portion of the nosepiece 452 and the control 454 is coupled to the frame 440 along a lower or middle portion of the control 454.

It is to be appreciated that the user can operate the control 454' with one hand thereby freeing the user's other hand for other activities (e.g., holding onto a handle of a bicycle, a steering wheel of an automobile, etc.). For example, the user can operate the control 454' using the user's thumb and index finger. Moreover, it is also to be appreciated that the user can operate the control 454' without having to remove the eyewear 400 from the user's face. In some implementations, the user can transition the eyewear 400 between the first and second positions while the nosepiece 452 and/or traction member 458 remains seated at the same general position on the user's nose such that, when the nosepiece 452 is moved, other components of the eyewear 400 such as the frame 440 and/or lens 460 moves relative to the user's face. For example, the nosepiece 452 and/or traction member 458 can remain seated on the user's nose without a substantial shift in the horizontal and/or vertical directions. In some instances, the nosepiece 352 and/or traction member 358 can remain seated on the user's nose without any shift in the horizontal and/or vertical directions. It is to be understood that the nosepiece 452 and/or traction member 458 can rotate slightly on the user's nose while remaining seated at the same general position on the user's nose.

In some embodiments, supports 110, 210, 310, 410, 1010 or components thereof, such as the earstems 120, 130, 220, 230, the frames 140, 340, 440, 1040 and/or the nosepiece assemblies 150, 250, 350, 450, 1050 can be fabricated using one or more metals, polymers, or other relatively stiff and/or resilient materials that can have desirable lens securing and stabilizing properties while nevertheless enabling the eyewear 100, 200, 300, 400, 1000 to provide desirable flexural properties in the earstems. For example, in some embodiments, steel such as stainless steel, titanium and its alloys, aluminum, carbon fiber, plastic, polymers such as acetate, polyurethane, polyurea, polycarbonate, PC-ABS, ABS, PVC, nylon 6, nylon 6-6, nylon 12, and other such materials can be used in the earstems 120, 130, 220, 230, and/or the nosepiece assemblies 150, 250, 350, 450, 1050 to provide superior mechanical properties while reducing the weight of the supports 110, 210, 310, 410, 1010. Any suitable metals, plastics or other rigid and/or resilient materials can be used to form the supports 110, 210, 310, 410, 1010 to provide exceptional rigidity, durability, and wear resistance. Nevertheless, various features and aspects disclosed herein can be used in eyewear fabricated from any material, e.g., plastic, acetate, composite, metal, etc., or any combination thereof.

The eyewear, such as eyewear 100, 200, 300, 400, 1000 can be useful in various settings, including sporting settings and military settings in which the wearer may experience conditions that may cause condensation on the lens, where the eyewear may be subject to dust or other debris, and/or where the eyewear may experience a ballistic impact. The ventilation provided by the eyewear can reduce or prevent fogging on the interior of the eyewear. In some embodiments, an anti-fogging coating can be applied to the interior of the eyewear (e.g., to the lens, such as lenses,) to reduce or prevent moisture fogging. Various types of anti-fogging coatings can be used (e.g., moisture absorption coatings, moisture sheer coatings, coatings based on urethanes, and/or coatings based on treated polysiloxanes).

The lens or lenses described herein, such as lens 160, 260, 360, 460, 1060 or lenses 162, 164, 262, 264, can be plano lenses (e.g., not curved). The lens or lenses can be linear (not curved) along a vertical plane (e.g., cylindrical or frusto-conical lens geometry). In some embodiments, the lens or lenses can be aligned substantially parallel with the vertical axis such that the line of sight is substantially normal to the anterior surface and the posterior surface of the lens. Various cylindrically shaped lenses may be used. The anterior surface and/or the posterior surface of the lens or lenses can conform to the surface of a right circular cylinder such that the radius of curvature along the horizontal axis is substantially uniform. An elliptical cylinder can be used to provide lenses that have non-uniform curvature in the horizontal direction. For example, a lens may be more curved near its lateral edge than its medial edge. In some embodiments, an oblique (non-right) cylinder can be used, for example, to provide a lens that is angled in the vertical direction.

In some embodiments, the lens or lenses can be canted lens mounted in a position rotated laterally relative to conventional centrally oriented dual lens mountings. A canted lens may be conceived as having an orientation, relative to the wearer's head, which would be achieved by starting with conventional dual lens eyeglass having centrally oriented lenses and bending the frame inwardly at the temples to wrap around the side of the head. When the eyewear, such as eyewear 100, 200, 300, 400, 1000 is worn, a lateral edge of the lens wraps significantly around and comes in close proximity to the wearer's temple to provide significant lateral eye coverage.

A degree of wrap may be desirable for aesthetic styling reasons, for lateral protection of the eyes from flying debris, or for interception of peripheral light. Wrap may be attained by utilizing lenses of tight horizontal curvature (high base), such as cylindrical or spherical lenses, and/or by mounting each lens in a position which is canted laterally and rearwardly relative to centrally oriented dual lenses. Similarly, a high degree of rake or lens tilt may be desirable for aesthetic reasons and for intercepting light, wind, dust or other debris from below the wearer's eyes. In general, "rake" will be understood to describe the condition of a lens, in the as-worn orientation, for which the normal line of sight strikes a vertical tangent to the lens or lenses at a non-perpendicular angle.

The lens or lenses can be provided with anterior and posterior surfaces and a thickness therebetween, which can be variable along the horizontal direction, vertical direction, or combination of directions. In some embodiments, the lens or lenses can have a varying thickness along the horizontal or vertical axis, or along some other direction. In some embodiments, the thickness of the lens or lenses tapers smoothly, though not necessarily linearly, from a maximum thickness proximate a medial edge to a relatively lesser thickness at a lateral edge. The lens or lenses can have a tapering thickness along the horizontal axis and can be decentered for optical correction. In some embodiments, the lens or lenses can have a thickness configured to provide an optical correction. For example, the thickness of lens or lenses can taper from a thickest point at a central point of the lens or lenses approaching lateral segments of the lens or lenses. In some embodiments, the average thickness of the lens or lenses in the lateral segments can be less than the average thickness of the lens or lenses in the central zone. In some embodiments, the thickness of the lens or lenses in at least one point in the central zone can be greater than the thickness of the lens or lenses at any point within at least one of the lateral segments. The lens or lenses can be formed of sheet plastic, molded plastic, glass, etc., as determined by the application of the lens.

Overview of Operation of Dynamic Venting System

FIGS. 9-15 are various illustrations of various embodiments of eyewear 500 in the form of eyeglasses worn on the head of a user 580. The eyewear 500 can include or share any or all of the components, features and/or characteristics described above in connection with any of the eyewear described herein, such as eyewear 100, 200, 300, 400, 1000.

With reference first to FIG. 9 which is a perspective view of the eyewear 500 as worn by a user 580, the eyewear 500 can include a support 510 having a right earstem 520, a left earstem 530, a frame face 540, and a nosepiece assembly 550. The nosepiece assembly 550 can support the eyewear 500 on the nose 582 of the user 580. The eyewear 500 can include lenses, such as right lens 562 and a left lens 564.

With reference next to FIGS. 10 and 11, top-oriented schematics of the eyewear 500 are illustrated in a first configuration and a second configuration. As shown in the illustrated embodiment, the first configuration can be positioned closer to the user's face which can provide for a lower degree of venting between the lens (not shown) and the user's face. In this first configuration, the nosepiece 552 of eyewear 500 can be positioned closer to the frame 540 of the eyewear. The second configuration can be positioned further from the user's face which can provide for a greater degree of venting between the lens and the user's face. In this second configuration, the nosepiece 552 of eyewear 500 can be positioned further from the frame 540 of the eyewear 500. For example, the nosepiece 552 can be positioned further from the frame 540 of the eyewear 500 via movement of a control or actuator 554. As shown in the illustrated embodiment, a lateral reference line 590 can pass through the left and right limits of the eyewear 500. The lateral reference line 590 can define a width of the eyewear 590. The lateral reference line 590 can be parallel to an anatomical medio-lateral axis which may lie on or parallel to the coronal plane. An anterior-posterior (AP) line 592 can extend straight ahead of the support 510 of the eyewear 500. This AP line 592 can extend within the anatomical sagittal plane. As shown, the AP line 592 can be transverse to the lateral reference line 590.

With reference next to FIGS. 12-15, side-oriented schematics of eyewear are illustrated in various configurations relative to a user's face. For simplicity, only the lens 560 of the eyewear is illustrated relative to a user's nose 582 and eye 584. As shown, the user's head is in an upright vertical position with the user's line of sight (LOS) in a straight-ahead viewing position (i.e., parallel to the AP line 592). It is to be understood that the eyewear can include one or more components of the eyewear described herein, such as eyewear 100, 200, 300, 400, 500 described above.

Embodiment of Posterior Configuration

Figure 12:
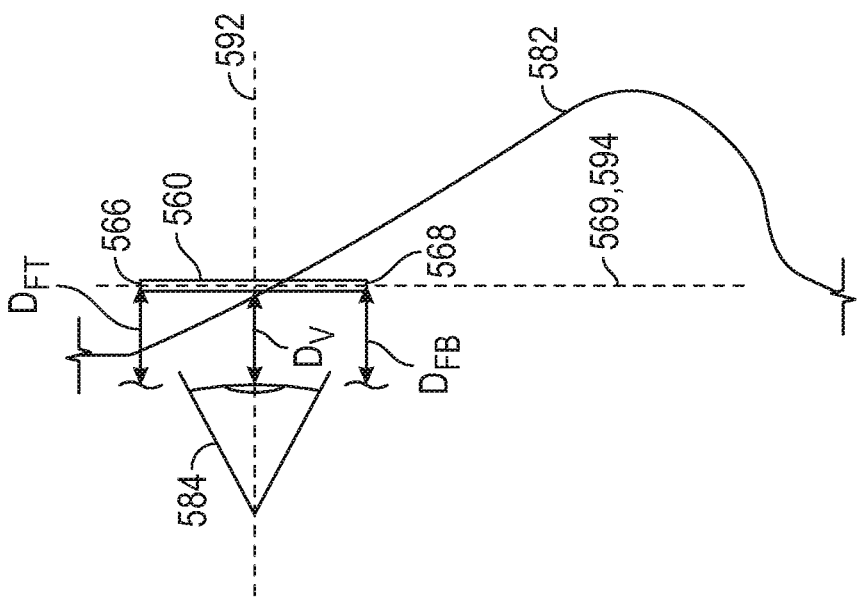
FIG. 12 illustrates a side-oriented schematic of the lens of eyewear of FIG. 9, the lens of the eyewear being in a first position.

With reference first to FIG. 12, the eyewear is shown in a first configuration with a lens 560 in a first position relative to the user's face. This configuration can correspond to the configuration illustrated in FIG. 10. Accordingly, the lens 560 can be positioned closer to the user's face—as compared to the second configurations described below—which can provide for a lower degree of venting between the lens 560 and the user's face. This can be beneficial in instances when venting is sufficient to reduce, inhibit, or eliminate condensation. This can also be beneficial in instances where further venting may cause user discomfort (e.g., due to drying of the eyes, dusty and/or windy environmental conditions, etc.). This configuration can also be beneficial in instances when the user would prefer a more compact form factor against the user's face. As shown, the lens 560 is linear in the vertical (e.g., a cylindrical, frustonical or planar lens); however, it is to be understood that any other type of lens can be used, such as a spherical lens.

The distance between the front of the user's cornea and the back surface of the lens 560 in the PA direction (i.e., the vertex distance) is illustrated by the line "$D_V$". The distance between the user's face and the upper or top edge 566 of the lens 560 (i.e., the top gap distance) is illustrated by the line "$D_{FT}$". The distance between the user's face and the lower or bottom edge 568 of the lens 560 (i.e., the bottom gap distance) is illustrated by the line "$D_{FB}$".

In the illustrated embodiment, the lens 560 can be oriented with little to no lens tilt (otherwise known as rake). That is, the lens axis 569 of the lens 560, which runs from the upper edge 566 to the lower edge 568 and contained within a plane parallel to the anatomical sagittal and/or a plane parallel to the anatomical coronal plane, is parallel with a vertical line 594 passing through the lens 560. However, it is to be understood that the lens 560 can be oriented with some degree of lens tilt. A high degree of lens tilt may be desirable for aesthetic reasons and for intercepting light, wind, dust or other debris from below the wearer's eyes. For example, the lens 560 can be oriented such that the lower edge 568 of the lens 560 is angled towards the user's cheekbone (i.e., pantascopic tilt). As another example, the lens 560 can be oriented such that the lower edge 568 of the lens 560 is angled away from the user's cheekbone (i.e., retroscopic tilt). Moreover, it is contemplated that the lens tilt 569 can differ across different vertical cross-sections of the lens 560.

Embodiment of Second Configuration with Posterior-Anterior Shift

Figure 13:
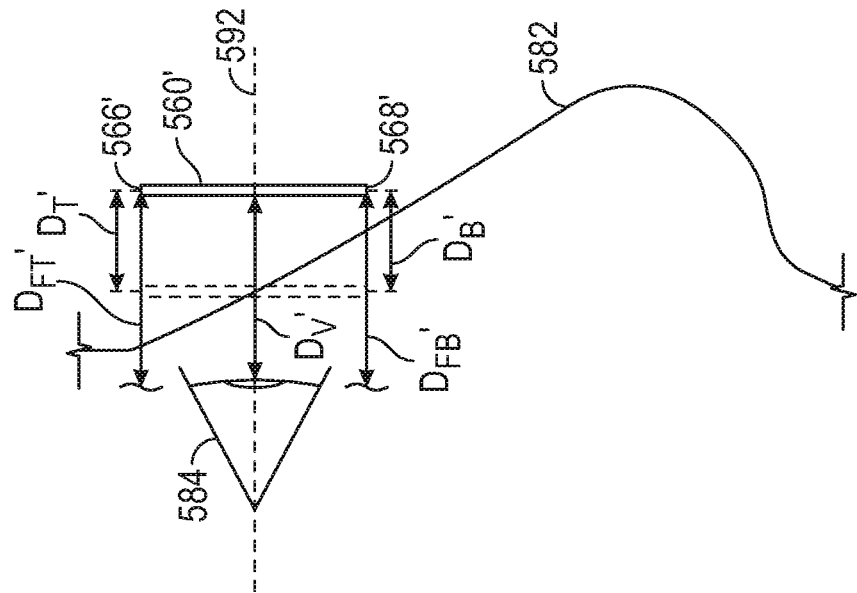
FIG. 13 illustrates a side-oriented schematic of the lens of eyewear of FIG. 12, the lens having been transitioned to a second position via a posterior-anterior shift.

With reference next to FIG. 13, the eyewear is shown in a second configuration with a lens 560' shifted towards a second position relative to the user's face. For convenience, the shifted lens 560' and associated geometry are indicated with a single prime (') to distinguish from the configuration shown in FIG. 12. Moreover, the lens 560 in the first position is included in FIG. 13 with dot-dash-dot lines to facilitate comparison with the second configuration illustrated in FIG. 13.

This configuration can correspond to the configuration illustrated in FIG. 11. Accordingly, the lens 560' can be positioned further from the user's face—as compared to the first position—which can provide for a higher degree of venting between the lens 560' and the user's face. This can be beneficial in instances when a greater degree of venting is desired to reduce, inhibit, or eliminate condensation.

The distance between the front of the user's cornea and the back surface of the lens 560' in the PA direction (i.e., the vertex distance) is illustrated by the line "$D_V$'". The distance between the user's face and the upper or top edge 566' of the lens 560' (i.e., the top gap distance) is illustrated by the line "$D_{FT}$'". The distance between the user's face and the lower or bottom edge 568' of the lens 560' (i.e., the bottom gap distance) is illustrated by the line "$D_{FB}$'".

The horizontal distance between the upper edge 566' of the lens 560' in the second position and the upper edge 566 of the lens 560 in the first position (i.e., the PA shift) is illustrated by the line "$D_T$'". The horizontal distance between the lower edge 568' of the lens 560' in the second position and the lower edge 568 of the lens 560 in the first position (i.e., the PA shift) is illustrated by the line "$D_B$'".

In the illustrated embodiment, the transition of the eyewear 500 from the first configuration to the second configuration primarily shifts the lens 560' along a PA direction (i.e., in a direction along the AP line 592) with little to no shift in the inferior-superior direction (i.e., in a direction along vertical line 594). For example, the shift in the inferior-superior direction can be less than ±4 mm, preferably less than ±3 mm, and more preferably less than ±2 mm. In some instances, this can be beneficial in maintaining optical qualities of the lens. As noted above, in some instances, the optical qualities of the lens are higher when the wearer's line of sight (LOS) extends through the center the lens. As shown, the PA shift of the upper edge 566' ($D_T$') of the lens 560' can be generally equal to the PA shift of the lower edge 568' ($D_B$') of the lens 560' (i.e., the ratio of the PA shift of the upper edge 566' ($D_T$') to the PA shift of the lower edge 568' ($D_B$') can be about 1:1). Moreover, as shown, the PA shift of the upper edge 566' ($D_T$') of the lens 560' can be generally equal to the PA shift of the vertex distance (i.e., $D_V$' minus $D_V$) (i.e., the ratio of the PA shift of the upper edge 566' ($D_T$') to the PA shift of the vertex distance (i.e., $D_V$' minus $D_V$) can be about 1:1). The shift in the top gap distance (i.e., $D_{FT}$' minus $D_{FT}$) can be generally equal to the shift in the bottom gap distance (i.e., $D_{BT}$' minus $D_{BT}$). However, it is to be understood that the ratio can be greater than or less than 1:1 as will be discussed in further detail in connection with the embodiment illustrated in FIG. 15.

In some embodiments, the PA shift of the upper edge 566' ($D_T$'), the PA shift of the lower edge 568' ($D_B$'), and/or the PA shift of the vertex distance (i.e., $D_V$' minus $D_V$) can be between about 1 mm to about 20 mm, between about 2 mm to about 15 mm, between about 3 mm to about 10 mm, between about 5 mm to about 8 mm, about 7 mm, about 8 mm, any sub-range within these ranges, or any other PA shift as desired. In some embodiments, the PA shift of the upper edge 566' ($D_T$'), the PA shift of the lower edge 568' ($D_B$'), and/or the PA shift of the vertex distance (i.e., $D_V$' minus $D_V$) can be at least about 1 mm, at least about 2 mm, at least about 3 mm, at least about 4 mm, at least about 5 mm, at least about 7 mm, at least about 8 mm, any sub-range within these ranges, or any other PA shift as desired.

As shown in the illustrated embodiment, the lens 560' as shifted to the second position can cause little to no change to the lens tilt or rake of the lens 560 as was present in the first position. For example, the lens tilt, when transitioning between the first position and the second position, can change less than ±4°, preferably less than ±3°, and more preferably less than ±2°. This can be particularly beneficial in maintaining optical qualities of the lens 560' in the second position. As noted above, in some instances the optical qualities of the lens are higher when the wearer's line of sight (LOS) extends in parallel to the optical center line (OCL) the lens. By maintaining the lens tilt or rake of the lens 560' in the second position, the angle of the wearer's LOS relative to the OCL of the lens 560' in the second position should be generally the same as that of the lens 560 in the first position.

As the lens 560 in the first position is illustrated with little to no lens tilt, the lens 560' in the second position is illustrated with little to no lens tilt. However, it is to be understood that the lens 560 in the first position can be oriented with some degree of lens tilt as described above. In such embodiments, the lens 560' in the second position can maintain about the same amount of lens tilt.

Embodiment of Second Configuration with Posterior-Anterior and Inferior-Superior Shifts With reference next to FIG. 14, the eyewear 500 is shown in a second configuration with a lens 560" shifted towards a second position relative to the user's face. For convenience, the shifted lens 560" and associated geometry are indicated with a double prime (") to distinguish from the configuration shown in FIGS. 12 and 13. Moreover, the lens 560 in the first position is included in FIG. 14 with dot-dash-dot lines to facilitate comparison with the second configuration illustrated in FIG. 14.

This configuration can correspond to the configuration illustrated in FIG. 11. Accordingly, the lens 560" can be positioned further from the user's face—as compared to the first position—which can provide for a higher degree of venting between the lens 560" and the user's face. This can be beneficial in instances when a greater degree of venting is desired to reduce, inhibit, or eliminate condensation.

The distance between the front of the user's cornea and the back surface of the lens 560" in the PA direction (i.e., the vertex distance) is illustrated by the line "$D_V''''$". The distance between the user's face and the upper or top edge 566" of the lens 560" (i.e., the top gap distance) is illustrated by the line "$D_{FT}''''$". The distance between the user's face and the lower or bottom edge 568" of the lens 560" (i.e., the bottom gap distance) is illustrated by the line "$D_{FB}''''$".

The horizontal distance between the upper edge 566" of the lens 560" in the second position and the upper edge 566 of the lens 560 in the first position (i.e., the PA shift) is illustrated by the line "$D_T''''$". The horizontal distance between the lower edge 568" of the lens 560" in the second position and the lower edge 568 of the lens 360 in the first position (i.e., the PA shift) is illustrated by the line "$D_B''''$". The vertical distance between the lower edge 568" of the lens 560" in the second position and the lower edge 568 of the lens 560 in the first position (i.e., the inferior-superior (IS) shift) is illustrated by the line "$D_H''''$".

In the illustrated embodiment, the transition of the eyewear 500 from the first configuration to the second configuration shifts the lens 560" along a PA direction (i.e., in a direction along the AP line 592) as well as along an inferior-superior direction (i.e., in a direction along a vertical line). In some instances, this can be beneficial in changing aerodynamic properties of the eyewear due to the greater distance between the user's face and the lens 560". Similar to the embodiment illustrated in FIG. 13, the PA shift of the upper edge 566" ($D_T''$) of the lens 560" can be generally equal to the PA shift of the lower edge 568" ($D_B''$) of the lens 560" (i.e., the ratio of the PA shift of the upper edge 566" ($D_T''$) to the PA shift of the lower edge 568" ($D_B''$) can be about 1:1). The shift in the top gap distance (i.e., $D_{FT}''$ minus $D_{FT}$) can be generally equal to the shift in the bottom gap distance (i.e., $D_{BT}''$ minus $D_{BT}$). However, it is to be understood that the ratio can be greater than or less than 1:1 as will be discussed in further detail in connection with the embodiment illustrated in FIG. 15. The PA shift of the upper edge 566" ($D_T''$) of the lens 560", the PA shift of the lower edge 568" ($D_B''$) of the lens 560", and/or the PA shift of the vertex distance (i.e., $D_V''$ minus $D_V$) can be similar to those described above in connection with FIG. 13.

The IS shift of the lower edge 568" of the lens 560" ($D_H''$) can be less than one or both of the PA shifts of the top edge 566" ($D_T''$) and lower edge 568" ($D_B''$). In some embodiments, the ratio of the IS shift of the lower edge 568" ($D_H''$) to the PA shift of the upper edge 566" ($D_T''$), the bottom edge 568" ($D_B''$), and/or the vertex distance ($D_V''$ minus $D_V$) can be less than about 1:1, less than about 0.7:1, less than about 0.5:1, less than about 0.3:1, less than about 0.1:1, any sub-range within these ranges, or any other ratio as desired.

In some embodiments, the IS shift of the lower edge 568" ($D_H''$) can be between about 1 mm to about 20 mm, between about 2 mm to about 15 mm, between about 3 mm to about 10 mm, between about 5 mm to about 8 mm, about 7 mm, any sub-range within these ranges, or any other IS shift as desired. It is to be understood that the IS shift can be measured from other parts of the lens 560" or eyewear, such as the upper edge 566" of the lens 560" or the optical center of the lens 560".

The angle formed between a plane parallel to the anatomical transverse plane (e.g., a horizontal plane) passing through the lower edge 568 of the lens 560 in the first position and a line connecting the lower edge 568 of the lens 560 in the first position and the lower edge 568" of the lens 560" in the second position (i.e., the shift angle) is illustrated by the angle "φ". The shift angle (φ") can be more parallel with the AP line 592 than with a line parallel to the anatomical superior-inferior axis (e.g., a vertical line). In some embodiments, the shift angle (φ") can be less than about 45°, less than about 35°, less than about 25°, less than about 10°, any sub-range within these ranges, or any other angle as desired.

As shown in the illustrated embodiment, the lens 560" as shifted to the second position can cause little to no change to the lens tilt or rake of the lens 560 as was present in the first position. For example, the lens tilt, when transitioning between the first position and the second position, can change less than ±4°, preferably less than ±3°, and more preferably less than ±2°. This can be particularly beneficial in maintaining optical qualities of the lens 560" in the second position. As noted above, typically the optical qualities of the lens are higher when the wearer's LOS extends in parallel to the OCL the lens. By maintaining the lens tilt or rake of the lens 560" in the second position, the angle of the wearer's LOS relative to the OCL of the lens 560" in the second position should be generally the same as that of the lens 560 in the first position.

As the lens 560 in the first position is illustrated with little to no lens tilt, the lens 560" in the second position is illustrated with little to no lens tilt. However, it is to be understood that the lens 560 in the first position can be oriented with some degree of lens tilt as described above. In such embodiments, the lens 560' in the second position can maintain about the same amount of lens tilt.

Embodiment of Second Configuration with Posterior-Anterior, Inferior-Superior, and Tilt Shifts With reference next to FIG. 15, the eyewear is shown in a second configuration with a lens 560''' shifted towards a second position relative to the user's face. For convenience, the shifted lens 560''' and associated geometry are indicated with a triple prime (''') to distinguish from the configuration shown in FIGS. 12-14. Moreover, the lens 360 in the first position is included in FIG. 15 with dot-dash-dot lines to facilitate comparison with the second configuration illustrated in FIG. 15.

This configuration can correspond to the configuration illustrated in FIG. 11. Accordingly, the lens 560''' can be positioned further from the user's face—as compared to the first position—which can provide for a higher degree of venting between the lens 560''' and the user's face. This can be beneficial in instances when a greater degree of venting is desired to reduce, inhibit, or eliminate condensation.

The distance between the front of the user's cornea and the back surface of the lens 560''' in the PA direction (i.e., the vertex distance) is illustrated by the line "$D_V'''''$". The distance between the user's face and the upper or top edge 566''' of the lens 560''' (i.e., the top gap distance) is illustrated by the line "$D_{FT}'''''$". The distance between the user's face and the lower or bottom edge 568''' of the lens 560''' (i.e., the bottom gap distance) is illustrated by the line "$D_{FB}'''''$".

The horizontal distance between the upper edge 566''' of the lens 560''' in the second position and the upper edge 566 of the lens 560 in the first position (i.e., the PA shift) is illustrated by the line "$D_T'''''$". The horizontal distance between the lower edge 568''' of the lens 560''' in the second position and the lower edge 568 of the lens 560 in the first position (i.e., the PA shift) is illustrated by the line "$D_B'''''$". The vertical distance between the lower edge 568''' of the lens 560''' in the second position and the lower edge 568 of the lens 560 in the first position (i.e., the inferior-superior (IS) shift) is illustrated by the line "$D_B'''''$".

In the illustrated embodiment, the shift from the first configuration to the second configuration shifts the lens 560''' along an PA direction (i.e., in a direction along the AP line 592) and/or along an inferior-superior direction (i.e., in a direction along vertical line 594). The shift from the first configuration to the second configuration also shifts the lens tilt of the lens 560'''. In some instances, this can be beneficial in changing aerodynamic properties of the eyewear due to the greater distance between the user's face and the lens 560'''.

While the PA shift of the upper edge 566'' ($D_T'''$) of the lens 560''' can be similar to the PA shift of the lower edge 568''' ($D_B'''$) of the lens 560''', the PA shifts are generally unequal to modify the lens tilt (i.e., the ratio of the PA shift of the upper edge 566''' ($D_T'''$) to the PA shift of the lower edge 568''' ($D_B'''$) is either greater than or less than 1:1). As shown in the illustrated embodiment, this ratio is less than 1:1 (i.e., the PA shift of the upper edge 566''' ($D_T'''$) is less than the PA shift of the lower edge 568''' ($D_B'''$)). In some embodiments, the ratio of the PA shift of the upper edge 566''' ($D_T'''$) to the PA shift of the lower edge 568''' ($D_B'''$) can be between about 1.5:1 to about 0.5:1, between about 1.3:1 to about 0.7:1, between about 1.2:1 to about 0.8:1, between about 1.1:1 to about 0.9:1, any sub-range within these ranges, or any other ratio as desired.

In some embodiments, the ratio of the PA shift of the upper edge 566''' ($D_T'''$) to the PA shift of the lower edge 568''' ($D_B'''$) can be between about 1:1 to about 0.5:1, between about 1:1 to about 0.7:1, between about 1:1 to about 0.8:1, between about 1:1 to about 0.9:1, any sub-range within these ranges, or any other ratio as desired. In some embodiments, the difference between the PA shift of the lower edge 568''' and the PA shift of the upper edge 566''' (i.e., $D_B'''$ minus $D_T'''$) can be between about 0.2 mm to about 5 mm, between about 0.25 mm to about 4 mm, between about 0.5 mm to about 3 mm, between about 1 mm to about 2 mm, any sub-range within these ranges, or any other difference as desired. In some embodiments, the difference between the PA shift of the lower edge 568''' and the PA shift of the upper edge 566''' (i.e., $D_B'''$ minus $D_T'''$) can be less than about 5 mm, less than about 4 mm, less than about 3 mm, less than about 2 mm, less than about 1 mm, less than about 0.5 mm, any sub-range within these ranges, or less than any other difference as desired.

In some embodiments, the ratio of the PA shift of the lower edge 568''' ($D_T'''$) to the PA shift of the upper edge 566''' ($D_B'''$) can be between about 1:1 to about 0.5:1, between about 1:1 to about 0.7:1, between about 1:1 to about 0.8:1, between about 1:1 to about 0.9:1, any sub-range within these ranges, or any other ratio as desired. In some embodiments, the difference between the PA shift of the upper edge 566''' and the PA shift of the lower edge 568''' (i.e., $D_T'''$ minus $D_B'''$) can be between about 0.2 mm to about 5 mm, between about 0.25 mm to about 4 mm, between about 0.5 mm to about 3 mm, between about 1 mm to about 2 mm, any sub-range within these ranges, or any other difference as desired. In some embodiments, the difference between the PA shift of the upper edge 566''' and the PA shift of the lower edge 568''' (i.e., $D_T'''$ minus $D_B'''$) can be less than about 5 mm, less than about 4 mm, less than about 3 mm, less than about 2 mm, less than about 1 mm, less than about 0.5 mm, any sub-range within these ranges, or less than any other difference as desired.

In some embodiments, the PA shift of the upper edge 566''' ($D_T'''$), the PA shift of the lower edge 568''' ($D_B'''$), and/or the PA shift of the vertex distance (i.e., $D_V'''$ minus $D_V$) can be between about 1 mm to about 20 mm, between about 2 mm to about 15 mm, between about 3 mm to about 10 mm, between about 5 mm to about 8 mm, about 7 mm, about 8 mm, any sub-range within these ranges, or any other PA shift as desired. In some embodiments, the PA shift of the upper edge 566''' ($D_T'''$), the PA shift of the lower edge 568''' ($D_B'''$), and/or the PA shift of the vertex distance (i.e., $D_V'''$ minus $D_V$) can be at least about 1 mm, at least about 2 mm, at least about 3 mm, at least about 4 mm, at least about 5 mm, at least about 7 mm, at least about 8 mm, any sub-range within these ranges, or any other PA shift as desired.

The angle formed between a plane parallel to the anatomical transverse plane (e.g., a horizontal plane) passing through the lower edge 568 of the lens 560 in the first position and a line connecting the lower edge 568 of the lens 560 in the first position and the lower edge 568''' of the lens 560''' in the second position (i.e., the shift angle) is illustrated by the angle "$\varphi''''$". The angle formed between a line parallel to the anatomical superior-inferior axis (e.g., vertical line 594''') passing through the lower edge 568''' of the lens 560''' in the second position and the lens axis 569''' in the second position (i.e., the lens tilt or rake) is illustrated by the angle "$\theta''''$".

As the lens 560 in the first position is illustrated with little to no lens tilt, the tilt shift of the lens 560''' (i.e., the change in lens tilt from first position to the second position) is illustrated as $\theta'''$. As shown in the illustrated embodiment, the tilt shift is in a retroscopic direction; however, it is to be understood that the tilt shift can be in the pantascopic direction. In some embodiments, the tilt shift can be less than about 15°, less than about 10°, less than about 8°, less than about 5°, less than about 2°, less than about 1°, less than about 0.5°, about 1°, about 0.5°, and sub-range within these ranges, or less than any other angle as desired. This can be beneficial in maintaining optical qualities of the lens 560''' in the second position. While the lens 560 in the first position is illustrated with little to no lens tilt, it is to be understood that the lens 560 in the first position can be oriented with some degree of lens tilt as described above.

The anterior shift of the vertex distance (i.e., $D_V'''$ minus $D_V$) can be similar to those described above in connection with FIG. 13. The superior shift of the lower edge 568''' ($D_H'''$) of the lens 560''' and/or the shift angle ($\varphi'''$) can be similar to those described above in connection with FIG. 14.

While the transitions from the first configuration to the second configuration discussed in connection with FIGS. 9-15 are shown with PA shifts in the anterior direction and/or IS shifts in the superior direction, it is to be understood that on or both of these directions can be reversed such that the transitions can include a PA shift in the posterior direction and/or an IS shift in the inferior direction. Moreover, while the second configurations described in connection with FIGS. 13-15 can be based on a particular embodiment of a nosepiece assembly 550, it is to be understood that a single eyewear 500 may be configured to have one or more of these configurations (i.e., a "second" configuration with a PA shift as shown in FIG. 13, a "third" configuration with a PA shift and IS shift as shown in FIG. 14, and/or a "fourth" configuration with a PA shift, IS shift, and tilt shift as shown in FIG. 15). In some embodiments, the eyewear 500 can be configured such that the eyewear 500 can be maintained in configurations between the described configurations described above. For example, the eyewear 500 could be continuously adjustable between these configurations. This can advantageously provide a user with a greater degree of control over the amount of venting. As another example, the eyewear 500 could include discrete adjustments between the configurations. In some embodiments, the eyewear 500 can include detents which fix the eyewear 500 and nosepiece assembly 550 in these discrete configurations (e.g., the "first" and "second" configurations). This can advantageously facilitate user operation by providing pre-set configurations.

Figure 21:
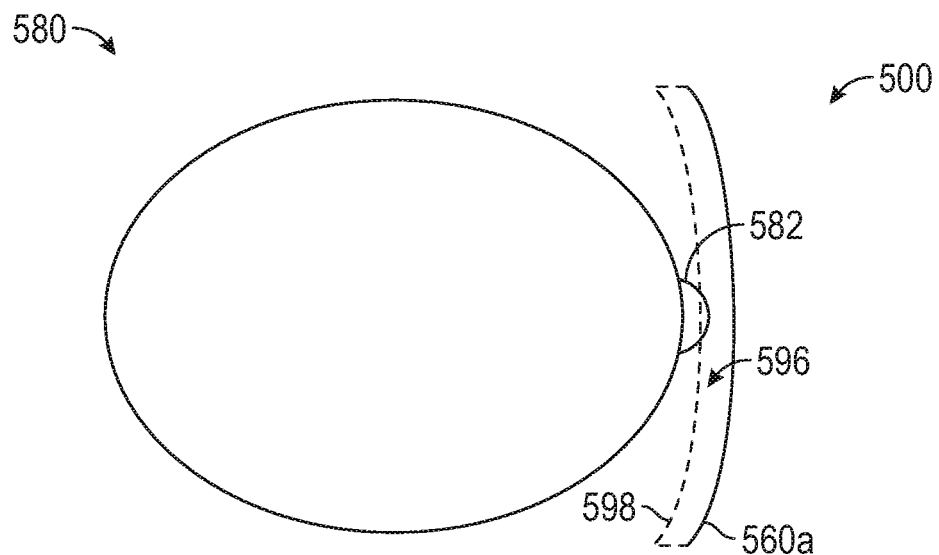
FIG. 21 illustrates a top-oriented schematic of the eyewear and user shown in FIG. 9, the eyewear being in a first configuration.
Figure 22:
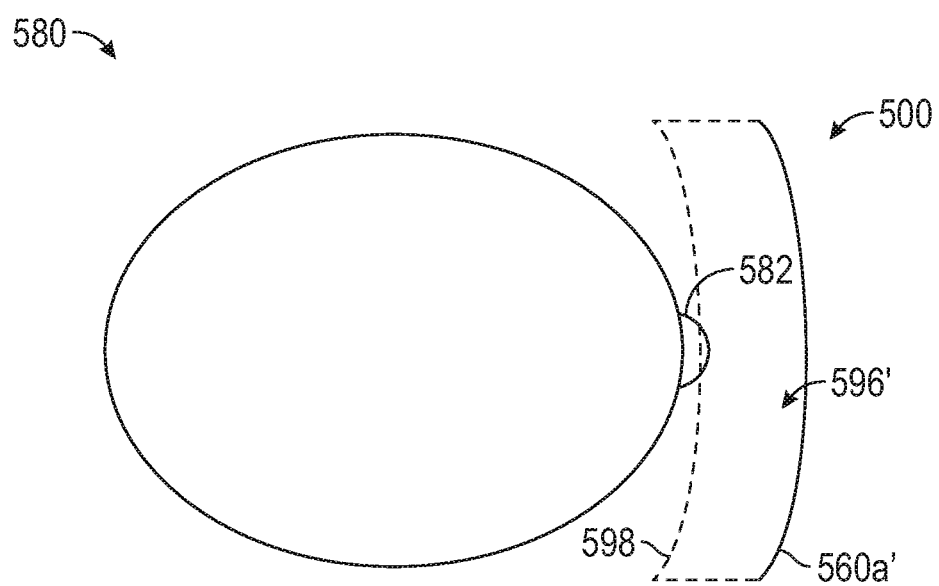
FIG. 22 illustrates a top-oriented schematic of the eyewear and user shown in FIG. 9, the eyewear being in a second configuration.

In any of the embodiments described above, the shift from the first configuration to the second configuration can increase a volume between a user's face and the one or more lenses of the eyewear. FIGS. 21 and 22 are schematic illustrations of eyewear 500 which show an increase in volume between the first configuration shown in FIG. 21 and the second configuration shown in FIG. 22. As shown in the illustrated embodiments, the eyewear 500 can include one or more lenses, a posterior surface 560a of which is shown. A lens volume 596 can be defined as a volume between the posterior surface 560a of the lens and a projection onto a virtual surface 598. The virtual surface 598 can have a curvature which matches that of the posterior surface of the lens 560a and/or a tilt which matches that of the lens tilt or rake of the posterior surface of the lens 560a. The virtual surface 596 can be positioned such that the virtual surface 598 intersects a contact point between the eyewear 500 and the user's nose 582. In instances where the eyewear contact a user's nose 582 at multiple points, the contact point can be chosen at an anterior-most point, a posterior-most point, a median between the anterior-most point and the posterior-most point.

In some embodiments, the percentage change in volume between the first configuration (represented by 596) and the second configuration (596') can be between about 50% to about 150%, preferably between about 75% to about 125%, and more preferably between about 85% to about 115%. For example, in the first configuration, the volume 596 can be about 27,000 mm$^3$ and, in the second configuration, the volume 596' can be about 53,500 mm$^3$. Although a unitary lens is illustrated in FIGS. 21 and 22, it is to be understood that a similar calculation can be made with respect to an eyewear having multiple lenses, such as a dual lens eyewear.

Overview of Movable Couplings

In some embodiments, eyewear described herein, such as eyewear 100, 200, 300, 400, 500, 1000, can include structures which reduce discomfort when transitioning between a first position and a second position. For example, in some embodiments, earstems of the support can include a material on at least a portion of the earstem which provides little to no friction. This can reduce the likelihood of the earstem pulling on a user's skin and/or hair when the eyewear is transitioned between a first position and a second position. As another example, in some embodiments, earstems of the support may be relatively straight to reduce the likelihood that the earstem pulled on the user's ear when the eyewear is transitioned between a first position and a second position. In some embodiments, the supports can include one or more features which allow the earstems to move relative to other portions of the support such as, but not limited to, the movable couplings described below.

FIGS. 16-18 are schematic illustrations of various embodiments of eyewear 600, 700, 800 in the form of eyeglasses. As shown in the illustrated embodiments, the eyewear 600, 700, 800 can include one or more supports 610, 710, 810 having one or more earstems. For purposes of brevity, only one side of the eyewear 600, 700, 800 is illustrated and described herein. It is to be understood that the components, features and/or characteristics described in connection with the right earstem 620, 720, 820 and frame or face 640, 740, 840 can be applied to the left earstem (not shown) and frame 640, 740, 840. Accordingly, in some embodiments both earstems of the supports 610, 710, 810 can include the components, features and/or characteristics described herein. The eyewear 600, 700, 800 can include or share any or all of the components, features and/or characteristics described above in connection with eyewear 100, 200, 300, 400, 500, 1000. Moreover, the eyewear 100, 200, 300, 400, 500, 1000 can include or share any or all of the components, features and/or characteristics described above in connection with eyewear 600, 700, 800.

As shown in the illustrated embodiments, the eyewear 600, 700, 800 can include one or more movable couplings 680, 780, 880 coupled to, formed on, or integrated into the one or more supports 610, 710, 810. In some embodiments, the one or more couplings 680, 780, 880 can be configured to allow parts of the supports 610, 710, 810 to move relative to other parts of the supports 610, 710, 810. This can be particular beneficial in allowing the eyewear 600, 700, 800 to be comfortably worn by a user in various configurations. For example, this can allow portions of the earstem of the eyewear 600, 700, 800 which contact a user's head to remain generally stationary while the frame 640, 740, 840 and/or lens (not shown) is moved relative to the user's head such as described above in connection with eyewear 100, 200, 300, 400, 500, 1000. This can reduce potential discomfort which may be caused if the portions of the earstem which contact the user's head are moved while worn on the user's head. Such discomfort could be caused, for example, due to use of a traction member and/or the overall shape of the earstem (e.g., earstems which hook around the user's ears).

The movable components described herein can be applied to embodiments of eyeglasses with unitary lenses, dual lenses, partial orbitals, and full orbitals as well as other types of eyewear such as, but not limited to, goggles. Moreover, the movable components described herein can be applied to other types of headworn supports such as, but not limited to, helmets, face masks, balaclavas, and breaching shields. For example, the goggle can include a strap to secure the goggle onto the head of a user. The strap can flex to accommodate changes in position of the frame and/or lens relative to the user's head. As another example, a helmet can include flexible components which allow structures of the helmet to which a lens is attached, such as a brim, which flex to accommodate changes in position of the frame and/or lens relative to the user's head.

Embodiment of Earstem with Movable Component

With reference first to FIG. 16, an embodiment of an eyewear 600 in the form on an eyeglass is illustrated having a support 610. The support 610 can include a right earstem 620, a left earstem (not shown), a frame or face 640 and a nosepiece assembly (not shown). The right earstem 620 can include an anterior end 622 and a posterior end 624. As noted above, a right half of the support is shown 610 and will be described for brevity. It is to be understood that the left half of the support can include similar components, features and/or characteristics described in connection with the right half. The right earstem 620 can include an anterior portion 626 and a posterior portion 628 coupled together via a movable coupling 680.

As shown in the illustrated embodiment, the right earstem 620 can be coupled to the frame 640 and/or the lens (not shown). For example, the right earstem 620 can be coupled to the right side 642 of the frame 640 at or proximate an anterior end 622 of the right earstem 620. In some embodiments, the right earstem 620 can be permanently affixed to the frame 640 and/or the lens. In some embodiments, the right earstem 620 can be rotatably coupled to the frame 640 via a rotatable coupling such as, but not limited to, a snap fit coupling or fasteners including screws or pins or any other rotatable coupling as desired.

The movable coupling 680 can allow the anterior portion 626 of the right earstem 620 to move (e.g., rotate and/or translate) relative to the posterior portion 628 of the right earstem 620. The movable coupling 680 can allow the anterior portion 626 to rotate and/or translate relative to the posterior portion 628 from a first, posterior configuration to a second, shifted configuration. In some embodiments, the movable coupling 680 can allow the anterior portion 626 to translate in the PA direction (i.e., along the longitudinal axis of the right earstem 620) relative to the posterior portion 628. This can, for example, account for a PA shift of the frame 640 and/or lens of the eyewear 600 relative to a user's face. In some embodiments, the movable coupling 680 can allow the anterior portion 626 to translate in the inferior-superior (IS) direction (i.e., in a vertical direction) relative to the posterior portion 628. This can, for example, account for an IS shift of the frame 640 and/or lens of the eyewear 600 relative to a user's face. In some embodiments, the movable coupling 680 can allow the anterior portion 626 to pivot relative to the posterior portion 628 at the movable coupling 680 along an anatomical medio-lateral axis or other horizontal axis. This can, for example, account for an IS shift and/or tilt shift of the frame 640 and/or lens of the eyewear 600 relative to a user's face. In some embodiments, the movable coupling 680 can allow the anterior portion 626 to pivot relative to the posterior portion 628 at the movable coupling 680 along an anatomical superior-inferior axis (i.e., a vertical axis). This can, for example, provide a more comfortable fit for the user.

The movable coupling 680 can be biased towards a desired configuration. For example, the movable coupling 680 can be biased towards a configuration which would be utilized more often by a user. For example, the movable coupling 680 can be biased towards a configuration which reduces the overall form factor of the right earstem 620 (e.g., the first, posterior configuration). This can advantageously facilitate operation of the movable coupling 680 by automatically reverting back to a desired configuration. In some embodiments, the movable coupling 680 can include a biasing member, such as a spring, which can bias the movable coupling 680 towards a desired configuration. In some embodiments, the movable coupling 680 can be formed from an elastic material, such as rubber, to bias the movable coupling 680 towards a desired configuration.

In some embodiments, the anterior portion 626 and the posterior portion 628 can be formed from separate components. These separate components can be coupled together via the movable coupling 680 to form the right earstem 620. In some embodiments, the movable coupling 680 can incorporate one or more slides which can restrict translation of the posterior portion 628 along axes of the one or more slides. In some embodiments, the movable coupling 680 can incorporate other mechanical joints including, but not limited to, a ball-and-socket joint and a hinge to allow rotation of the posterior portion 628 relative to the anterior portion 626.

In some embodiments, the anterior portion 626, the posterior portion 628, and/or the movable coupling 680 can be integrally formed as a single unit. For example, the anterior portion 626, the posterior portion 628, and the movable coupling 680 can be monolithically formed with the movable coupling 680 formed from an elastic material to allow the posterior portion 628 to be moved relative to the anterior portion 626.

Figure 19:
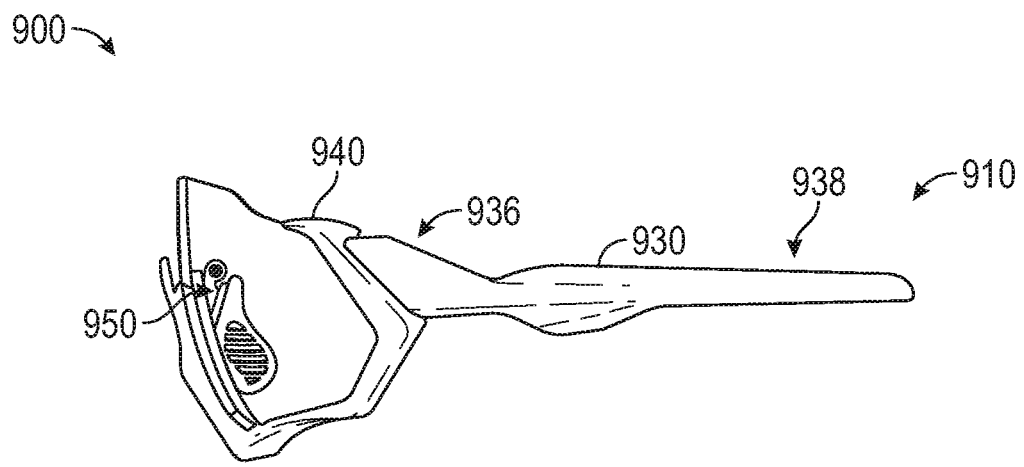
FIG. 19 illustrates a side-oriented view of an embodiment of an eyewear having a movable coupling on an earstem of the eyewear in a first configuration.
Figure 20:
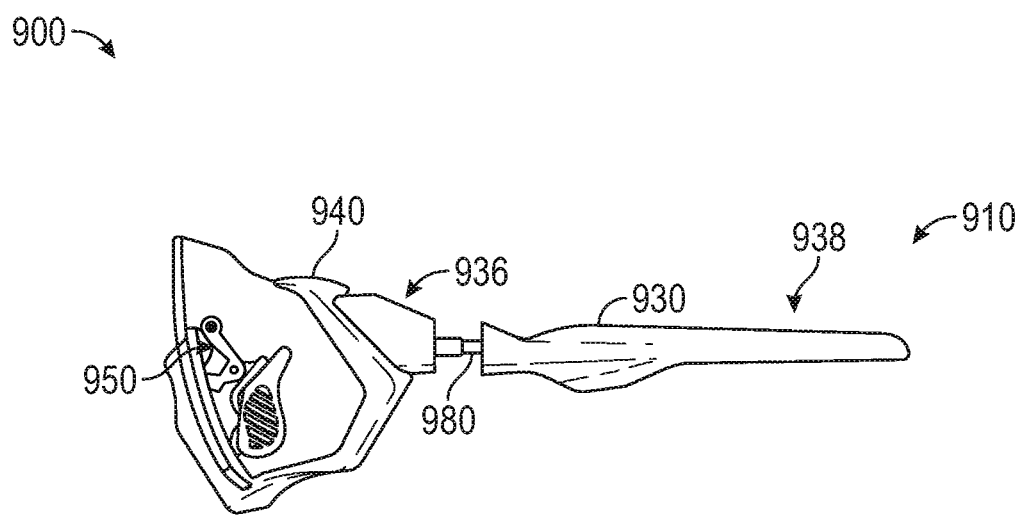
FIG. 20 illustrates a side-oriented view of the eyewear of FIG. 19 in a second configuration.

With reference next to FIGS. 19 and 20, an embodiment of an eyewear 900 in the form on an eyeglass is illustrated having a support 910. The support 910 can include a left earstem 930, a right earstem (not shown), a frame or face 940 and a nosepiece assembly 950. A left half of the support 910 will be described for brevity. It is to be understood that the right half of the support can include similar components, features and/or characteristics described in connection with the right half. The left earstem 930 can include an anterior portion 936 and a posterior portion 938 coupled together via a movable coupling 980.

As shown in the illustrated embodiment, the movable coupling 980 can allow the anterior portion 936 of the left earstem 930 to move relative to the posterior portion 938 of the left earstem 930. The movable coupling 980 can allow the anterior portion 936 to translate relative to the posterior portion 938 from a first, posterior configuration shown in FIG. 19 to a second, shifted configuration shown in FIG. 20. As shown, the movable coupling 980 can allow the anterior portion 936 to translate in the PA direction (i.e., along the longitudinal axis of the left earstem 930) relative to the posterior portion 938. This can, for example, account for a PA shift of the frame 940 and/or lens of the eyewear 900 relative to a user's face. This PA shift can be caused, for example, by transitioning the nosepiece assembly 950 from a first configuration shown in FIG. 19 to a second configuration shown in FIG. 20.

Embodiment of Hinged Movable Component

With reference first to FIG. 17, an embodiment of an eyewear 700 in the form on an eyeglass is illustrated having a support 710. The support 710 can include a right earstem 720, a left earstem (not shown), a frame or face 740 and a nosepiece assembly (not shown). The right earstem 720 can include an anterior end 722 and a posterior end 724. As noted above, a right half of the support is shown 710 and will be described for brevity. It is to be understood that the left half of the support can include similar components, features and/or characteristics described in connection with the right half.

As shown in the illustrated embodiment, the right earstem 720 can be coupled to the frame 740 and/or the lens (not shown) via a movable coupling 780. For example, the right earstem 720 can be coupled to the right side 742 of the frame 740 at or proximate an anterior end 722 of the right earstem 720. The movable coupling 780 can allow the right earstem 720 to move (e.g., rotate and/or translate) relative to the frame 740.

In some embodiments, the movable coupling 780 can allow the right earstem 720 to translate relative to the frame 740 and/or lens from a first, posterior configuration to a second, shifted configuration. In some embodiments, the movable coupling 780 can allow the frame 740 and/or lens to translate in the PA direction (i.e., along the longitudinal axis of the right earstem 720) relative to the right earstem 720. This can, for example, account for a PA shift of the frame 740 and/or lens of the eyewear 700 relative to a user's face. In some embodiments, the movable coupling 780 can allow the frame 740 and/or lens to translate in the inferior-superior (IS) direction (i.e., in a vertical direction) relative to the right earstem 720. This can, for example, account for an IS shift of the frame 740 and/or lens of the eyewear 700 relative to a user's face. In some embodiments, the movable coupling 780 can allow the frame 740 and/or lens to pivot relative to the right earstem 720 at the movable coupling 780 along an anatomical medio-lateral axis or other horizontal axis. This can, for example, account for an IS shift and/or tilt shift of the frame 740 and/or lens of the eyewear 700 relative to a user's face. In some embodiments, the movable coupling 780 can allow the frame 740 and/or lens to pivot relative to the right earstem 720 at the movable coupling 780 along an anatomical superior-inferior axis (i.e., a vertical axis). This can, for example, provide a more comfortable fit for the user and/or allow the eyewear 700 to be transitioned from an open or closed configuration.

The movable coupling 780 can be biased towards a desired configuration. For example, the movable coupling 780 can be biased towards a configuration which would be utilized more often by a user. For example, the movable coupling 780 can be biased towards a configuration which reduces the overall form factor of the right earstem 720 (e.g., the first, posterior configuration). This can advantageously facilitate operation of the movable coupling 780 by automatically reverting back to a desired configuration. In some embodiments, the movable coupling 780 can include a biasing member, such as a spring, which can bias the movable coupling 780 towards a desired configuration. In some embodiments, the movable coupling 780 can be formed from an elastic material, such as rubber, to bias the movable coupling 780 towards a desired configuration.

In some embodiments, the right earstem 720 and the frame 740 can be formed from separate components. These separate components can be coupled together via the movable coupling 780. In some embodiments, the movable coupling 780 can incorporate one or more slides which can restrict translation of the right earstem 720 along axes of the one or more slides. In some embodiments, the movable coupling 780 can incorporate other mechanical joints including, but not limited to, a ball-and-socket joint and a hinge to allow rotation of the right earstem 720 relative to the frame 740 and/or lens.

In some embodiments, the right earstem 720, the frame 740, and/or the movable coupling 780 can be integrally formed as a single unit. For example, the right earstem 720, the frame 740, and the movable coupling 780 can be monolithically formed with the movable coupling 780 formed from an elastic material to allow the right earstem 720 to be moved relative to the frame 740.

Although eyewear 700 includes a frame 740, it is to be understood that the eyewear 700 can be frameless or rimless. In such an embodiment, the movable coupling 780 can be positioned between the right earstem 720 and the lens 760.

Embodiment of Frame with Movable Component

With reference next to FIG. 18, an embodiment of an eyewear 800 in the form on an eyeglass is illustrated having a support 810. The support 810 can include a right earstem 820, a left earstem (not shown), a frame or face 840 and a nosepiece assembly (not shown). The right earstem 820 can include an anterior end 822 and a posterior end 824. As noted above, a right half of the support is shown 810 and will be described for brevity. It is to be understood that the left half of the support can include similar components, features and/or characteristics described in connection with the right half. The frame 840 can include a lateral portion 846 and a medial portion 848 coupled together via a movable coupling 880.

As shown in the illustrated embodiment, the right earstem 820 can be coupled to the frame 840 and/or the lens (not shown). For example, the right earstem 820 can be coupled to the right side 842 of the frame 840 at or proximate an anterior end 822 of the right earstem 820. In some embodiments, the right earstem 820 can be permanently affixed to the frame 840 and/or the lens. In some embodiments, the right earstem 820 can be rotatably coupled to the frame 840 via a rotatable coupling such as, but not limited to, a snap fit coupling or fasteners including screws or pins or any other rotatable coupling as desired.

The movable coupling 880 can allow the lateral portion 846 of the frame 840 to move (e.g., rotate and/or translate) relative to the medial portion 848 of the frame 840. The movable coupling 880 can allow the lateral portion 846 to rotate and/or translate relative to the medial portion 848 from a first, posterior configuration to a second, shifted configuration. In some embodiments, the movable coupling 880 can allow the lateral portion 846 to translate in the PA direction (i.e., along the longitudinal axis of the right earstem 820) relative to the medial portion 848. This can, for example, account for a PA shift of the frame 840 and/or lens of the eyewear 800 relative to a user's face. In some embodiments, the movable coupling 880 can allow the lateral portion 846 to translate in the inferior-superior (IS) direction (i.e., in a vertical direction) relative to the medial portion 848. This can, for example, account for an IS shift of the frame 840 and/or lens of the eyewear 800 relative to a user's face. In some embodiments, the movable coupling 880 can allow the lateral portion 846 to pivot relative to the medial portion 848 at the movable coupling 880 along an anatomical medio-lateral axis or other horizontal axis. This can, for example, account for an IS shift and/or tilt shift of the frame 840 and/or lens of the eyewear 800 relative to a user's face. In some embodiments, the movable coupling 880 can allow the lateral portion 846 to pivot relative to the medial portion 848 at the movable coupling 880 along an anatomical superior-inferior axis (i.e., a vertical axis). This can, for example, provide a more comfortable fit for the user.

The movable coupling 880 can be biased towards a desired configuration. For example, the movable coupling 880 can be biased towards a configuration which would be utilized more often by a user. For example, the movable coupling 880 can be biased towards a configuration which reduces the overall form factor of the frame 840 (e.g., the first, posterior configuration). This can advantageously facilitate operation of the movable coupling 880 by automatically reverting back to a desired configuration. In some embodiments, the movable coupling 880 can include a biasing member, such as a spring, which can bias the movable coupling 880 towards a desired configuration. In some embodiments, the movable coupling 880 can be formed from an elastic material, such as rubber, to bias the movable coupling 880 towards a desired configuration.

In some embodiments, the lateral portion 846 and the medial portion 848 can be formed from separate components. These separate components can be coupled together via the movable coupling 880 to form the frame 840. In some embodiments, the movable coupling 880 can incorporate one or more slides which can restrict translation of the lateral portion 846 along axes of the one or more slides. In some embodiments, the movable coupling 880 can incorporate other mechanical joints including, but not limited to, a ball-and-socket joint and a hinge to allow rotation of the lateral portion 846 relative to the medial portion 848.

In some embodiments, the lateral portion 846, the medial portion 848, and/or the movable coupling 880 can be integrally formed as a single unit. For example, the lateral portion 846, the medial portion 848, and the movable coupling 880 can be monolithically formed with the movable coupling 880 formed from an elastic material to allow the lateral portion 846 to be moved relative to the medial portion 848. In some embodiments, the lateral portion 846, the medial portion 848, and the movable coupling 880 can be monolithically formed with the movable coupling 880 formed as a living hinge to allow the lateral portion 846 to be moved relative to the medial portion 848.

Other Embodiments

While the components of the eyewear, such as nosepiece assemblies, and changes in geometry between the eyewear and the user described herein are generally discussed as providing dynamic venting capabilities for a user, it is to be understood that the nosepiece components of the eyewear and changes in geometry can be designed to maintain desirable positioning of the lens relative to the user.

As one example, the nosepiece components of the eyewear and changes in geometry can be designed to maintain desirable positioning of the lens relative to the user when the user switches from a first activity to a second activity (e.g., optical qualities of the lens). In some embodiments, the nosepiece assemblies can advantageously provide desirable optical qualities in a first configuration when the user is in a "standard" activity (i.e., head in an upright vertical position) and desirable optical qualities in a second configuration when the user is in a heads-down activity (i.e., head angled towards floor). For example, the first configuration and the second configuration can shift the angle of the optical centerline relative to the anatomical transverse plane such that, in the first configuration, the user's LOS is generally aligned with the OCL when the user's head is in an upright vertical position and, in the second configuration, the user's LOS is generally aligned with the OCL when the user's head is in heads-down position. In some embodiments, the OCL can be shifted upwardly relative to the anatomical transverse plane by about 5°, by about 15°, by about 20°, by about 30°, or more. In some embodiments, the nosepiece assemblies can be used to position the lens in a desirable location relative to the user. For example, in situations where the user is perspiring heavily, it can be beneficial to position the lens further from the user to reduce the likelihood of perspiration collecting on the lens.

As another example, the nosepiece components of the eyewear and changes in geometry can be designed to maintain desirable positioning of the lens relative to the user when the user switches between lens powers of a multi-focal lens (e.g., bifocal, trifocal, etc.). In some embodiments, the nosepiece assemblies can advantageously provide a desirable lens power when the user is engaged in a first activity (e.g., far vision) and desirable optical qualities in a second configuration when the user is in a second activity (e.g., reading). For example, the first configuration and the second configuration can shift the lens relative to the anatomical transverse plane such that, in the first configuration, the user's LOS is generally through a portion of the multi-focal lens having a first lens power and, in the second configuration, the user's LOS is generally through a portion of the multi-focal lens having a second lens power. In some embodiments, the lens can be shifted upwardly relative to the anatomical transverse plane by about 5°, by about 15°, by about 20°, by about 30°, or more. In some embodiments, the nosepiece assemblies can be used to position the lens in a desirable location relative to the user.

While certain embodiments have been described, these embodiments have been presented by way of example only, and are not intended to limit the scope of the disclosure. Indeed, the novel devices, system and methods described herein may be embodied in a variety of other forms. Furthermore, various omissions, substitutions and changes in the systems and methods described herein may be made. The accompanying claims and their equivalents are intended to cover such forms or modifications as would fall within the scope of the disclosure. Accordingly, the scope of the present disclosure is defined only by reference to the claims presented herein or as presented in the future.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that such features, elements and/or steps are in any way required for one or more embodiments.

Moreover, the following terminology may have been used herein. The singular forms "a," "an," and "the" include plural referents unless the context clearly dictates otherwise. Thus, for example, reference to an item includes reference to one or more of such items. The term "ones" refers to one, two, or more, and generally applies to the selection of some or all of a quantity. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The term "about," "approximately," or "generally," means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. For example, in some embodiments, the terms "about", "approximately", or "generally", may be within 20% of the stated value. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, in some embodiments, the terms "substantially" may be within 5% of the stated value.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

What is claimed is:

1. Eyewear, comprising:
   a frame, extending laterally between left and right limits, having a lateral reference line extending from side to side through the left and right limits and an anterior-posterior (AP) reference line transverse to the lateral reference line and extending straight ahead of the frame;
   at least one lens supported by the frame; and
   a nosepiece pivotably connected to the frame, wherein the nosepiece is configured to rotate relative to the frame while in an as-worn position between at least:
   a first position such that a reference point on the lens is at a first vertex distance from an eye of a wearer in an as-worn orientation; and
   a second position such that the reference point is maintained at a second vertex distance from the eye of the wearer in the as-worn orientation, wherein the second vertex distance is different from the first vertex distance.

2. The eyewear of claim 1, wherein the nosepiece is pivotal about a nosepiece axis that is substantially parallel to a transverse axis of the eyewear.

3. The eyewear of claim 2, wherein the nosepiece axis is positioned closer to the top of the nosepiece than the bottom.

4. The eyewear of claim 1, further comprising a control for moving the nosepiece.

5. The eyewear of claim 4, wherein the control comprises a lever.

6. The eyewear of claim 5, wherein the lever is positioned anteriorly of the frame.

7. The eyewear of claim 4, wherein the control is configured for single hand operation while the eyewear is being worn.

8. The eyewear of claim 1, wherein a difference between the first and second vertex distances, measured along a line parallel to the AP reference line, is at least about 7 mm.

9. The eyewear of claim 1, wherein a difference between the first and second vertex distances, measured along a line parallel to the AP reference line, is between about 5 mm and about 8 mm.

10. The eyewear of claim 1, wherein a lens tilt changes no more than about 1 degree between the first position and the second position.

11. The eyewear of claim 1, wherein an upper edge and a lower edge of the at least one lens are inferiorly-superiorly (IS) shifted, and wherein the upper edge and the lower edge of the at least one lens are posteriorly-anteriorly (PA) shifted.

12. The eyewear of claim 11, wherein the ratio of the IS shift to the PA shift of the at least one lens is less than or equal to about 0.3:1.

13. The eyewear of claim 1, wherein a lens volume increases between about 75% to about 125% in the second position.

14. The eyewear of claim 1, wherein the eyewear is an eyeglass comprising earstems.

15. The eyewear of claim 14, wherein each earstem comprises a movable coupling.

16. The eyewear of claim 1, wherein the eyewear is a goggle comprising a goggle strap.

17. The eyewear of claim 1, wherein the nosepiece is movable while in the as-worn position to at least a third position, the third position being between the first and second positions.

18. The eyewear of claim 1, wherein the nosepiece is configured to pivot while in the as-worn position between at least the first and second positions.

19. The eyewear of claim 1, wherein the nosepiece is configured to translate while in the as-worn position between at least the first and second positions.

20. The eyewear of claim 1, wherein the nosepiece is configured to change shape while in the as-worn position between at least the first and second positions.

21. The eyewear of claim 1, wherein, in the as-worn position, the eyewear is configured to provide more venting in at least the second position than in the first position.

22. The eyewear of claim 1, wherein:
   an upper edge of the at least one lens is posteriorly-anteriorly (PA) shifted;
   a lower edge of the at least one lens is posteriorly-anteriorly (PA) shifted; and
   the PA shifts of the upper and lower edges of the at least one lens are approximately the same.

23. The eyewear of claim 1, wherein:
   the eyewear is an eyeglass, wherein the at least one lens has a top edge and a bottom edge held by the frame such that the top edge is spaced apart from a face of the wearer by a top gap distance and the bottom edge is spaced apart from the face of the wearer by a bottom gap distance; and
   wherein the top gap distance and the bottom gap distance change by substantially the same amount as the nosepiece is moved while in the as-worn position between a forward position and a rearward position.

24. The eyewear of claim 1, wherein the eyewear has a retrofittable nosepiece assembly comprising the nosepiece and one or more mounts configured to be attached to an existing headworn support, wherein the eyewear has been retrofitted with a nosepiece assembly.

25. A headworn support, comprising:
   a frame, extending laterally between left and right limits, having an anterior-posterior (AP) reference axis extending straight ahead of the frame;
   at least one lens supported by the frame, the at least one lens having an upper edge and a lower edge; and
   a nosepiece carried by the frame and movable relative to the frame, wherein the nosepiece is configured to remain in contact with a nose of a user in an as worn position when the nosepiece moves relative to the frame between at least a first configuration and a second configuration such that, when worn by the user:
   the upper edge of the at least one lens is posteriorly-anteriorly (PA) shifted; and
   the lower edge of the at least one lens is posteriorly-anteriorly (PA) shifted;
   wherein the PA shifts of the upper and lower edges of the at least one lens are approximately the same, and wherein, in the as-worn position, the eyewear is configured to provide more venting in at least the second configuration than in the first configuration.

26. The headworn support of claim 25, wherein a lens tilt changes no more than about 1 degree between the first position and the second position.

27. The headworn support of claim 25, wherein the headworn support is an eyeglass comprising earstems.

28. The headworn support of claim 25, wherein the headworn support is a helmet.

29. An eyeglass with selectively variable venting, comprising:
  a frame;
  left and right earstems;
  at least one lens having a top edge and a bottom edge held by the frame such that the top edge is spaced apart from a face of a wearer by a top gap distance and the bottom edge is spaced apart from the face of the wearer by a bottom gap distance; and
  a nosepiece carried by the eyeglass such that it is movable relative to the frame, wherein the nosepiece is configured to contact a nose of a user;
  wherein the top gap distance and the bottom gap distance change by substantially the same amount when the nosepiece is moved relative to the frame between at least a forward position and a rearward position while in contact with the nose of the user in an as-worn position to effect a respective forward frame position and a rearward frame position.

30. The eyeglass of claim 29, wherein the nosepiece is configured to pivot while in the as-worn position between at least the forward and rearward positions.

31. The eyeglass of claim 29, further comprising a control for advancing the nosepiece between the forward and rearward positions, wherein manipulation of the control while the eyeglass is in the as-worn position advances the nosepiece relative to the frame to effect the forward and rearward frame positions and changes the top gap distance and bottom gap distance without changing a lens tilt of the lens.

32. A nosepiece assembly configured to be attached to a headworn support, the headworn support including a frame having an anterior-posterior (AP) reference axis extending straight ahead of the frame, and at least one lens supported by the frame, the at least one lens having an upper edge and a lower edge, the nosepiece assembly comprising:
  a nosepiece pivotably coupled to the frame; and
  a mechanism pivotably coupled to the nosepiece and coupled to the frame;
  wherein actuating the mechanism rotates the nosepiece relative to the frame between at least a first configuration and a second configuration such that, when worn by a user:
  the upper edge of the at least one lens is posteriorly-anteriorly (PA) shifted; and
  the lower edge of the at least one lens is posteriorly-anteriorly (PA) shifted.

33. The nosepiece assembly of claim 32, wherein the nosepiece assembly is retrofittable onto an existing headworn support.

34. The nosepiece assembly of claim 33, wherein the nosepiece assembly comprises one or more mounts configured to be attached to the existing headworn support.

35. The nosepiece assembly of claim 32, wherein the PA shifts of the upper and lower edges of the at least one lens of the headworn support are approximately the same.

36. The nosepiece assembly of claim 32, wherein a lens tilt changes no more than about 2 degrees between the first configuration and the second configuration.

37. The nosepiece assembly of claim 32, wherein the nosepiece is pivotal about a nosepiece axis that is substantially parallel to a transverse axis of the nosepiece assembly.

38. The nosepiece assembly of claim 32, wherein the headworn support is an eyeglass comprising earstems.

39. The nosepiece assembly of claim 32, wherein transitioning between at least the first and second configurations enhances venting.

40. The nosepiece assembly of claim 32, wherein at least the nosepiece and the mechanism are movable while in an as-worn position between at least the first configuration and the second configuration.

* * * * *